(12) United States Patent
Bassalleck et al.

(10) Patent No.: US 12,107,293 B2
(45) Date of Patent: Oct. 1, 2024

(54) CHASSIS ASSEMBLY FOR ENERGY STORAGE EQUIPMENT

(71) Applicant: Gridworks, Inc., Albuquerque, NM (US)

(72) Inventors: Kevin Bassalleck, Albuquerque, NM (US); Blake Richards, Rio Rancho, NM (US); Dustin Neel, Albuquerque, NM (US); Nikola Babic, Albuquerque, NM (US); Daniel L. Rice, Santa Fe, NM (US); Philip Undercuffler, Madrid, NM (US)

(73) Assignee: Gridworks, Inc., Albuquerque, NM (US)

( * ) Notice: Subject to any disclaimer, the term of this patent is extended or adjusted under 35 U.S.C. 154(b) by 413 days.

(21) Appl. No.: 17/174,790

(22) Filed: Feb. 12, 2021

(65) Prior Publication Data

US 2021/0257698 A1    Aug. 19, 2021

Related U.S. Application Data

(60) Provisional application No. 62/975,923, filed on Feb. 13, 2020.

(51) Int. Cl.
*H01M 50/298* (2021.01)
*H01M 50/209* (2021.01)
(Continued)

(52) U.S. Cl.
CPC ....... *H01M 50/298* (2021.01); *H01M 50/209* (2021.01); *H02G 1/06* (2013.01); *H02G 3/0456* (2013.01)

(58) Field of Classification Search
CPC . Y02E 60/10; H05K 7/20; H02G 1/06; H02G 3/0456; H01M 50/298; H01M 50/209
See application file for complete search history.

(56) References Cited

U.S. PATENT DOCUMENTS

| | | | |
|---|---|---|---|
| 10,020,772 B1 * | 7/2018 | Puri | H02S 10/40 |
| 2007/0274042 A1 * | 11/2007 | Jackson | B25H 3/028 |
| | | | 361/695 |

(Continued)

FOREIGN PATENT DOCUMENTS

| | | |
|---|---|---|
| CN | 204190220 U | 3/2015 |
| DE | 2043699 A1 | 3/1972 |
| DE | 102018209271 A1 | 12/2019 |

*Primary Examiner* — Kiran Quraishi Akhtar
(74) *Attorney, Agent, or Firm* — Peacock Law P.C.; Justin R. Muehlmeyer

(57) ABSTRACT

Assemblies for supporting energy storage equipment, and more particularly, pre-fabricated, above-ground, affixed, ventilated or non-ventilated, power feeder chassis assemblies for large-scale electrical energy storage equipment, comprising a frame unit with certain features that make it capable of supporting energy storage equipment and a cable feeder with certain features that connect destination equipment to the electrical energy storage equipment. Various features of the assembly are described. Also described are methods of manufacturing the same, some of which are directed to methods of pre-fabrication, mass manufacture and transportability. Also described are methods of installing the same, some of which are directed to methods of laying out in grid patterns for large-scale projects.

11 Claims, 27 Drawing Sheets

(51) Int. Cl.
*H02G 1/06* (2006.01)
*H02G 3/04* (2006.01)

(56) References Cited

U.S. PATENT DOCUMENTS

| | | | |
|---|---|---|---|
| 2012/0031488 A1* | 2/2012 | Kaufman | H02S 20/00 |
| | | | 136/259 |
| 2016/0141894 A1* | 5/2016 | Beaston | H02J 7/0014 |
| | | | 320/103 |
| 2017/0077566 A1 | 3/2017 | Mascianica et al. | |
| 2019/0305531 A1* | 10/2019 | Fujimura | B60R 16/0215 |

* cited by examiner

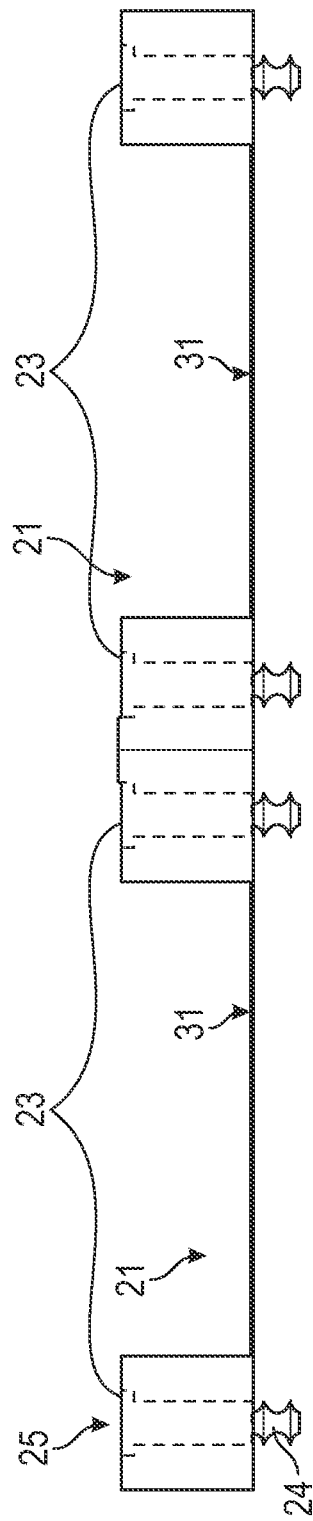
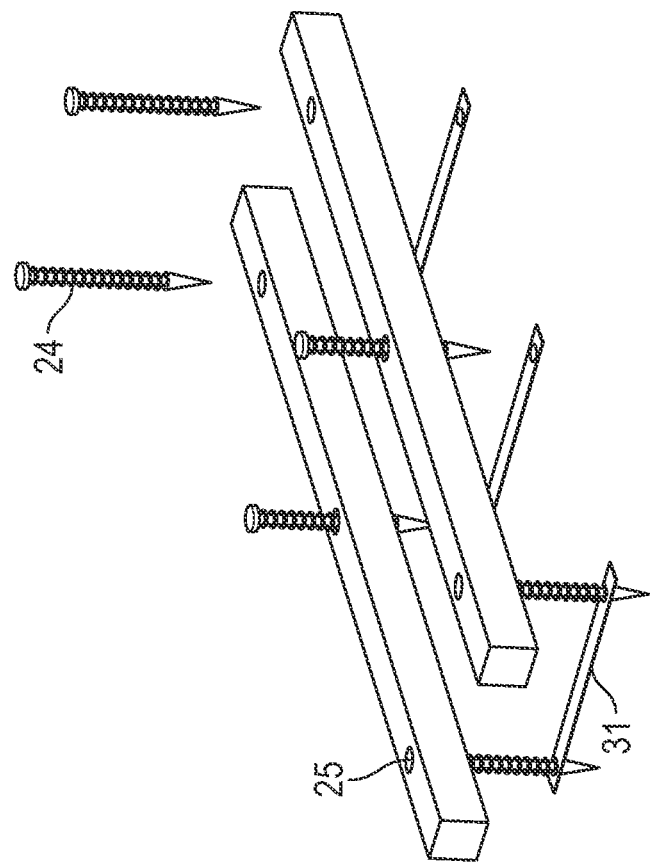
FIG. 3A
FIG. 3B

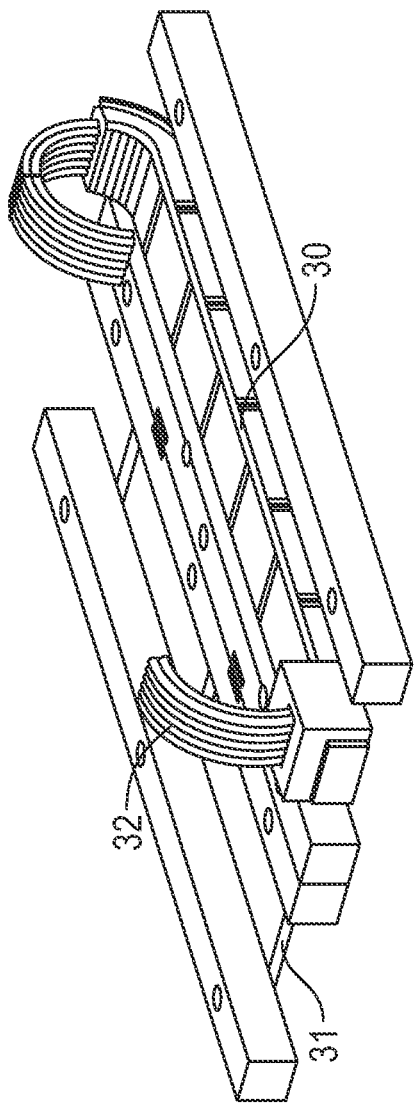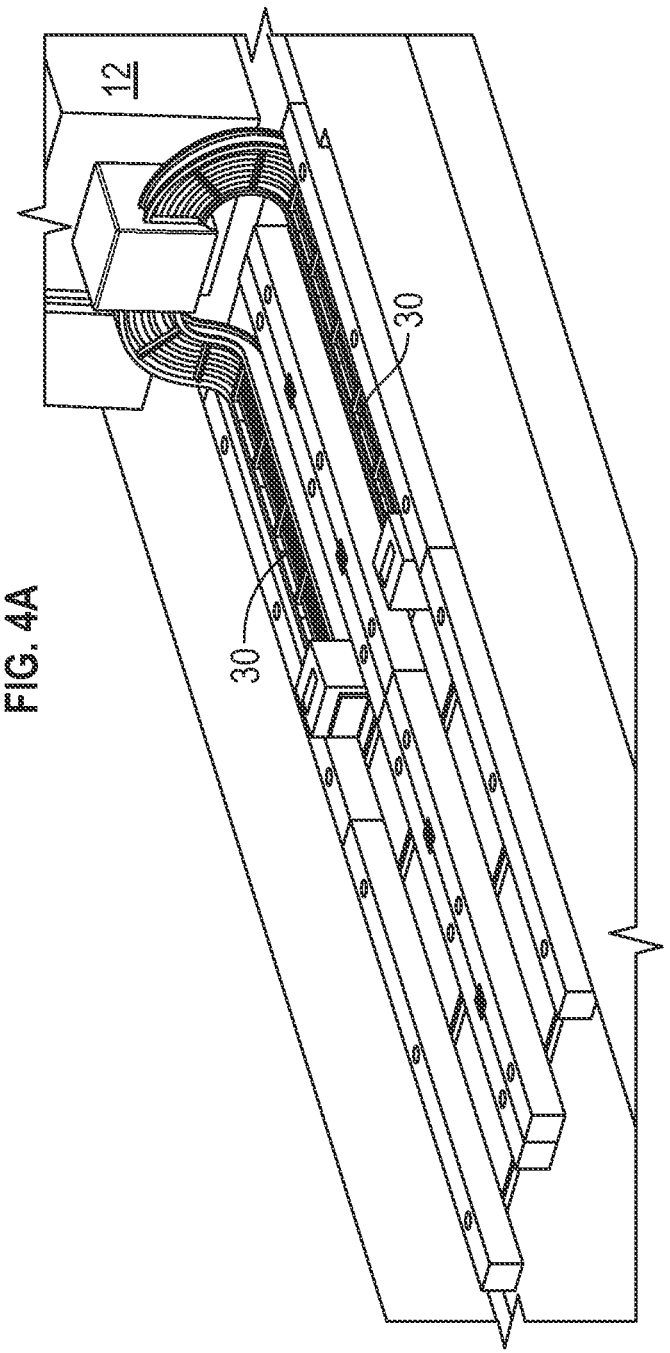
FIG. 4A
FIG. 4B

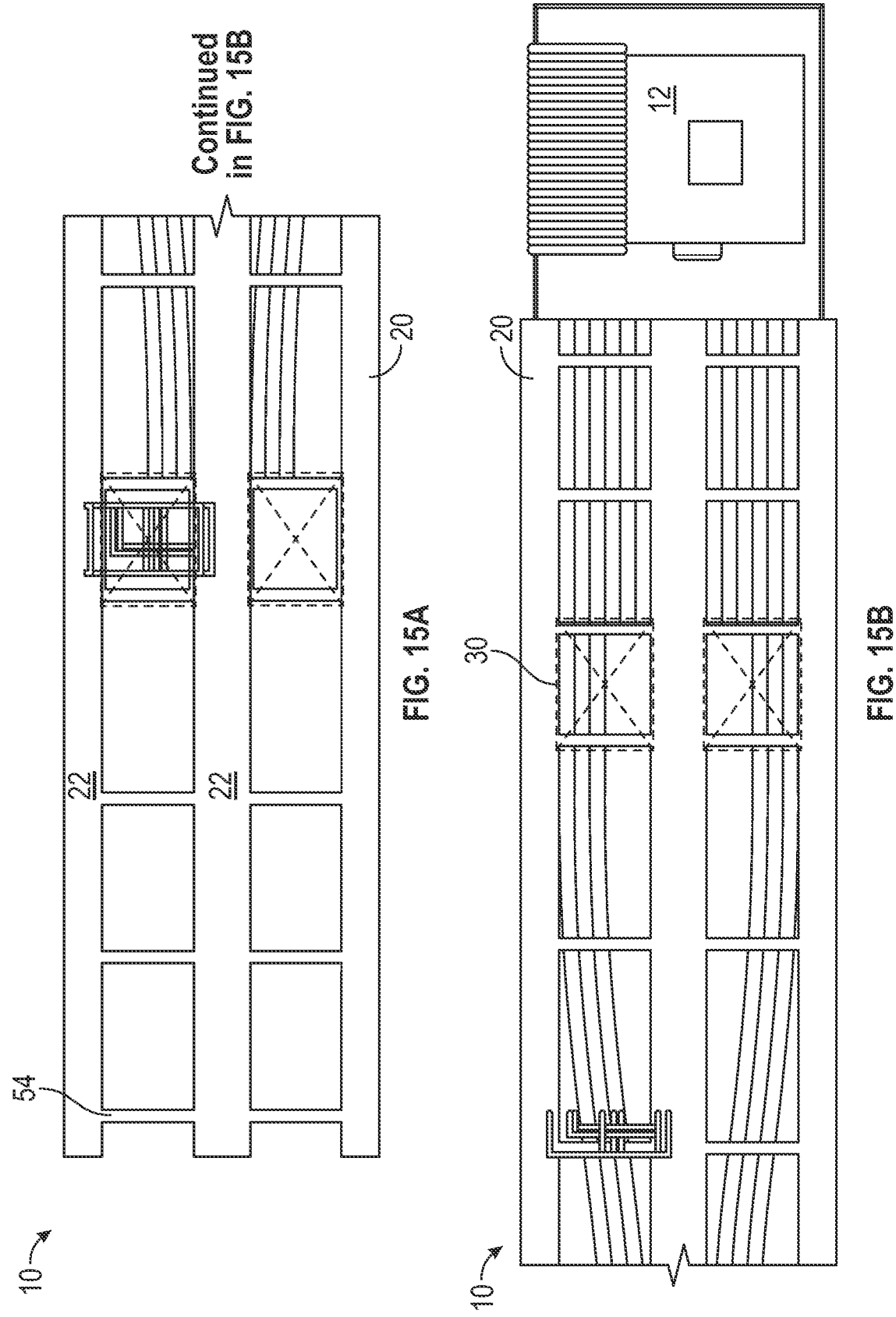

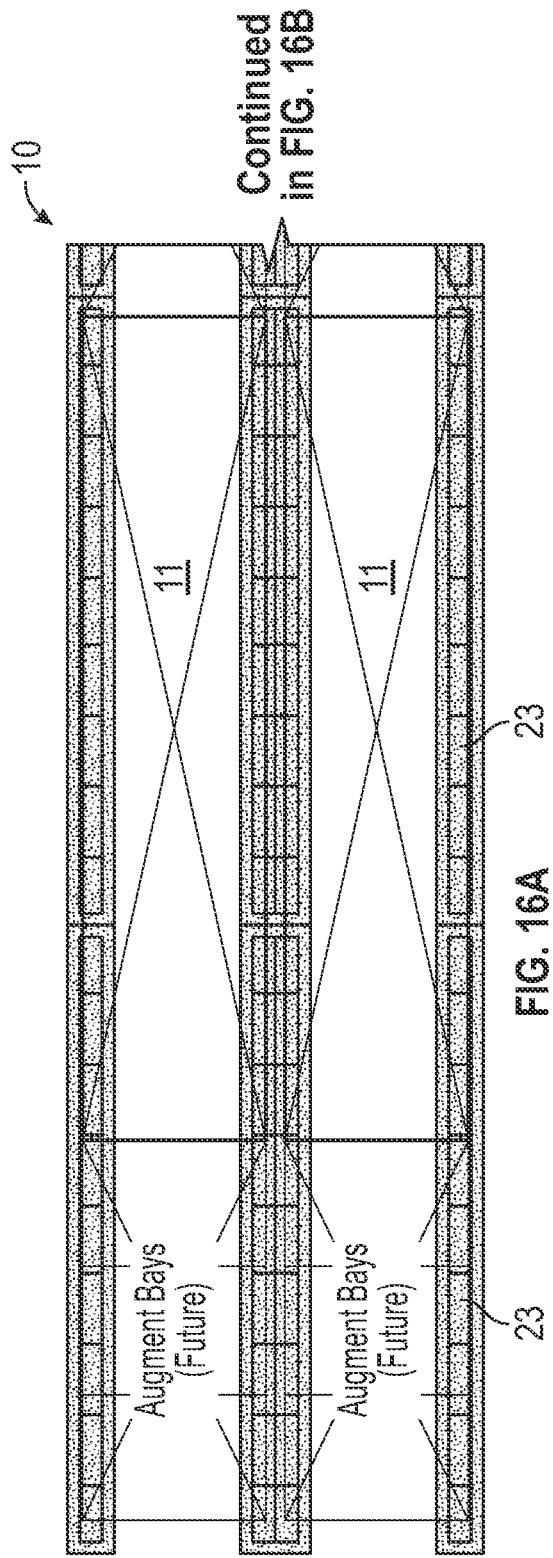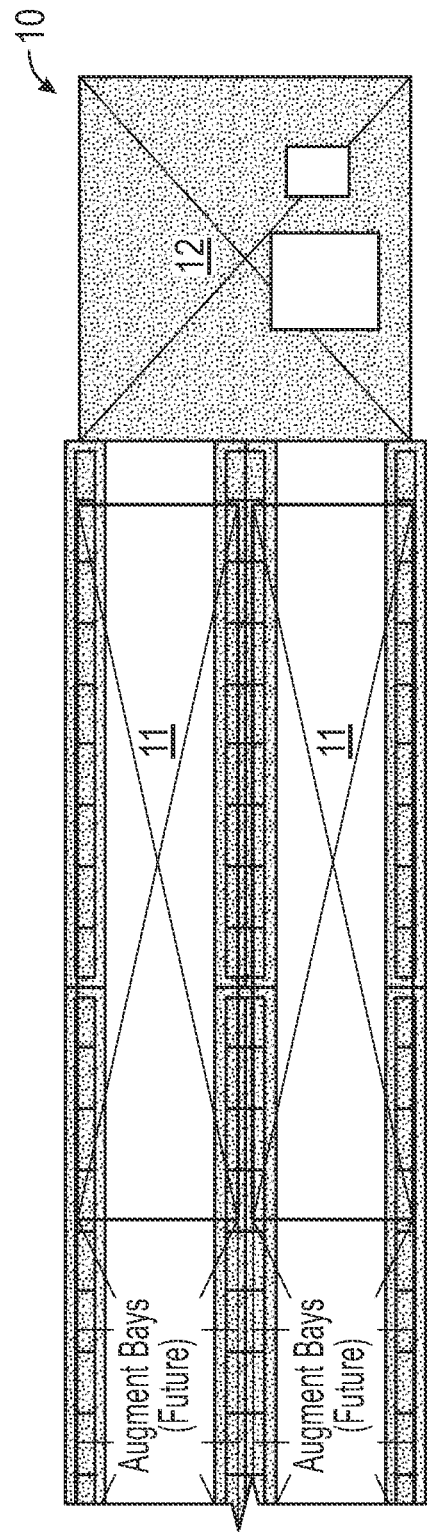

CHASSIS ASSEMBLY FOR ENERGY STORAGE EQUIPMENT

CROSS-REFERENCE TO RELATED APPLICATIONS

This application claims priority to and the benefit of U.S. Provisional Patent Application No. 62/975,923, entitled "Chassis Assembly for Energy Storage Equipment", filed on Feb. 13, 2020, and the specification and drawings thereof are incorporated herein by reference.

BACKGROUND OF THE INVENTION

Field of the Invention

Embodiments of the present invention relate to assemblies for supporting energy storage equipment, and more particularly, pre-fabricated, above-ground, affixed, ventilated or non-ventilated, power feeder chassis assemblies for large-scale electrical energy storage equipment.

Description of Related Art

With the growing demand for renewable energy has come the need for energy storage that manages the intermittency of renewable energy sources and that connects with grid infrastructure. Various large-scale (e.g., utility or business) electrical energy storage systems ("ESS") provide high-capacity battery modules, inverters, and thermal management systems in pre-assembled enclosures that can be delivered to the site of the renewable energy source and integrated into the site's power grid (such energy storage systems hereinafter referred to as "Source Equipment"). Source equipment needs to be connected to the various energy systems at the site, including but not limited to electrical transformers (for example, oil-filled transformers), switchgear, external inverters, DC-DC converters, metering equipment, etc. (hereinafter referred to as "Destination Equipment"). Installing Source Equipment at the site and connecting the Source Equipment to the Destination Equipment is a costly effort, often requiring concrete foundations or concrete pads to be prepared and laid, ancillary equipment pads to be installed, trenches to be dug, and cables and raceways to be installed. What is needed is a pre-fabricated structural foundation that connects the Source Equipment to the Destination Equipment via an affixed, above-ground, ventilated or non-ventilated, power-feeder chassis structure.

BRIEF SUMMARY OF EMBODIMENTS OF THE PRESENT INVENTION

Embodiments of the present invention are directed to an assembly apparatus comprising: a first frame unit comprising a top, bottom, first end and second end, the first frame unit capable of supporting energy storage equipment to be disposed on the top of the first frame unit; a cable feeder disposed on the first frame unit, the cable feeder extending at least partially between the first and second end of the first frame unit and at least partially below the top of the first frame unit, and the cable feeder comprising: a body forming a cable passage through which at least one cable can pass, a cable outlet comprising an outlet through which at least one cable can pass, and a cable inlet at or near the first end of the frame unit capable of receiving cables connectable to destination energy equipment. In another embodiment of the assembly apparatus, the energy storage equipment that the first frame unit is capable of supporting has a storage capacity of at least about 10 kWh. In another embodiment of the assembly apparatus, the energy storage equipment that the first frame unit is capable of supporting has a storage capacity of at least about 1 MWh. In another embodiment of the assembly apparatus, the first frame unit comprises a first member and a second member, the members spaced from each other to form a cavity extending entirely along the length of the first frame unit between the first end and the second end and between the members, wherein the cable feeder is disposed within the cavity. In another embodiment of the assembly apparatus, the assembly comprises a cross brace disposed between the first member and second member of the first frame unit, and wherein the cable feeder is disposed on the cross brace. In another embodiment of the assembly apparatus, the cable inlet of the cable feeder comprises a curve shape extending above the top of the first frame unit. In another embodiment, the cable feeder comprises at least one rigid structure at least partially surrounding each of at least one cable configured to space each of at least one cable from the other. In another embodiment of the assembly apparatus, the first frame unit comprises a mechanical anchoring system capable of securing the first frame unit to the ground. In another embodiment, the assembly further comprises at least one cable comprising a length at least extending from the first end of the first frame unit to the cable outlet, the cable capable of connecting the energy storage equipment to the destination energy equipment.

In another embodiment of the assembly apparatus of the present invention: the first frame unit comprises a first member and a second member, the members spaced from each other to form a cavity extending entirely along the length of the first frame unit between the first end and the second end and between the members, wherein the cable feeder is disposed within the cavity; the energy storage equipment that the first frame unit is capable of supporting has a storage capacity of at least about 1 MWh; the cable feeder is disposed on at least one cross brace extending entirely between the first member and second member of the first frame unit; the cable feeder comprises a flexible tube and a rigid chassis assembly, the rigid chassis assembly at or near the cable outlet; the first frame unit comprises channels extending through the first and second members of the first frame unit sized to receive a mechanical anchoring system capable of securing the first frame unit to the ground; and the cable inlet of the cable feeder comprises a curve shape extending above the top of the first frame unit.

Embodiments of the present invention are also directed to a method of manufacturing an assembly apparatus, the method comprising: manufacturing a first frame unit comprising a top, bottom, first end and second end, the first frame unit capable of supporting energy storage equipment to be disposed on the top of the first frame unit; a cable feeder disposed on the first frame unit, the cable feeder extending at least partially between the first and second end of the first frame unit and at least partially below the top of the first frame unit, and the cable feeder comprising a body forming a cable passage through which at least one cable can pass, a cable outlet comprising an outlet through which at least one cable can pass, and a cable inlet at or near the first end of the frame unit capable of receiving cables connectable to destination energy equipment; and delivering the first frame unit for installation at a destination site. In another embodiment of the method of manufacture, the first frame unit comprises a first member and a second member, the members spaced from each other to form a cavity extending entirely along the length of the first frame unit between the first end and the second end and between the members, wherein the cable feeder is disposed within the cavity; the energy storage equipment that the first frame unit is capable of supporting has a storage capacity of at least about 1 MWh; the cable feeder is disposed on at least one cross brace extending entirely between the first member and second member of the first frame unit; the cable feeder comprises a flexible tube and a rigid chassis assembly, the rigid chassis assembly at or near the cable outlet; the first frame unit comprises channels extending through the first and second members of the first frame unit sized to receive a mechanical anchoring system capable of securing the first frame unit to the ground; and the cable inlet of the cable feeder comprises a curve shape extending above the top of the first frame unit. In another embodiment of the method of manufacture, the method also comprises manufacturing a second frame unit comprising all the features of the first frame unit and stacking the first and second frame units one on top of the other on a transport vehicle, before the step of delivering.

Embodiments of the present invention are also directed to methods of connecting energy storage equipment to destination energy equipment, the method comprising: providing a first frame unit comprising a top, bottom, first end and second end, the first frame unit capable of supporting energy storage equipment to be disposed on the top of the first frame unit, and a cable feeder disposed on the first frame unit, the cable feeder extending at least partially between the first and second end of the first frame unit and at least partially below the top of the first frame unit, and the cable feeder comprising a body forming a cable passage through which at least one cable can pass, a cable outlet comprising an outlet through which at least one cable can pass, and a cable inlet at or near the first end of the frame unit capable of receiving cables connectable to destination energy equipment; laying the first frame unit on the ground at the destination at or near destination energy equipment, such that the first end of the first frame unit is at or near the destination energy equipment; and placing at least one cable extending from the destination energy equipment into the cable inlet of the cable feeder of the first frame unit and extending to and out the cable outlet of the cable feeder of the first frame unit. In another embodiment of the method of connecting energy storage equipment to destination energy equipment, the method further comprises placing a first energy storage equipment on top of the first frame unit and connecting the at least one cable to it, wherein the first energy storage equipment has a storage capacity of at least about 1 MWh. In another embodiment of the method of connecting energy storage equipment to destination energy equipment, the method further comprises securing the first frame unit to the ground using mechanical devices. In another embodiment of the method of connecting energy storage equipment to destination energy equipment, the method further comprises providing a second frame unit which comprises all the features of the first frame unit; laying the second frame unit on the ground such that its first end is at or near the destination energy equipment and such that it is adjacent to the first frame unit; and placing at least one cable extending from the destination energy equipment into the cable inlet of the cable feeder of the second frame unit and extending through the cable feeder of the second frame unit to and out the cable outlet of the cable feeder of the second frame unit. In another embodiment of the method of connecting energy storage equipment to destination energy equipment, the method further comprises placing a second energy storage equipment on top of the second frame unit and connecting the at least one cable placed in the cable feeder of the second frame unit to it, wherein the second energy storage equipment has a storage capacity of at least about 1 MWh. In another embodiment of the method of connecting energy storage equipment to destination energy equipment, the first frame unit comprises a first member and a second member, the members spaced from each other to form a cavity extending entirely along the length of the first frame unit between the first end and the second end and between the members, wherein the cable feeder is disposed within the cavity, and wherein the cable feeder is disposed on at least one cross brace extending entirely between the first member and second member of the first frame unit, and the method further comprises: providing a second frame unit which comprises all the features of the first frame unit; laying the second frame unit on the ground such that the first end of the first frame unit is at or near the destination energy equipment and such that the first frame unit is adjacent to the first frame unit; placing at least one cable extending from the destination energy equipment into the cable inlet of the cable feeder of the second frame unit and extending through the cable feeder of the second frame unit to and out the cable outlet of the cable feeder of the second frame unit; and further comprising placing a second energy storage equipment on top of the second frame unit and connecting the at least one cable placed in the cable feeder of the second frame unit to it, wherein the second energy storage equipment has a storage capacity of at least about 1 MWh. In another embodiment of the method of connecting energy storage equipment to destination energy equipment, the method further comprises storing energy in the first and second energy storage equipment, the energy received from the destination energy equipment.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. Although some of the figures illustrate or suggest dimensions, the use of such dimensions is merely intended to provide the reader with an example of the invention—to be clear, such dimensions are not essential to the operation of the invention and one or more, or even all, of the dimensions can be changed and will provide desirable results. The drawings are only for the purpose of illustrating one or more embodiments of the invention and are not to be construed as limiting the invention. In the drawings:

FIGS. 3A-3B are a series of illustrations of views of assemblies according to embodiments of the present invention, FIG. 3A illustrating a front view of an assembly comprising foundation sections and FIG. 3B illustrating a perspective view of a portion of an assembly and the various components for securing it to the ground during foundation installation;

FIGS. 4A-4B are a series of illustrations of perspective views of assemblies according to embodiments of the present invention, FIG. 4A illustrating a portion of an assembly comprising a cable bus system and FIG. 4B illustrating an assembly comprising a cable bus system connected to Destination Equipment;

FIGS. 15A-15B are a series of illustrations of plan views of an installation plan according to an embodiment of the present invention, FIG. 15A illustrating a portion of the configuration and FIG. 15B illustrating the remaining portion of the configuration;

FIGS. 16A-16B are a series of illustrations of plan views of a foundation plan according to an embodiment of the present invention, FIG. 16A illustrating a portion of the configuration and FIG. 16B illustrating the remaining portion of the configuration;

DETAILED DESCRIPTION OF THE INVENTION

One of the objectives of the present invention is to provide a structural foundation and cable conduits for connecting Source Equipment to Destination Equipment (as those terms are defined above) that is a single assembly integrating all structural, electrical and mechanical components necessary to connect the Source Equipment to the Destination Equipment. Another objective of the present invention is to provide such an assembly pre-fabricated, meaning that all of its components are manufactured and assembled prior to delivery of the assembly to the site of installation, to eliminate the costly need for extensive on-site customization and construction. Another objective of the present invention is to provide such an assembly that can be quickly deployed and adapted to a multitude of varying site conditions. Additionally, aspects of the power chassis would provide for removal and re-deployment of the Source Equipment to a new site.

For purposes of describing orientation and placement of various objects described herein, the "first end" of an object would be the end of that object closest to where it would relate with Destination Equipment 12, for example, that end of frame 20 disposed next to pad 26 of Destination Equipment 12. The "second end" of an object is that opposite the first end, or furthest from Destination Equipment 12. The "top" of an object refers to that side or surface of an object furthest from the ground and closest to Source Equipment 11, for example, that side of frame 20 in direct contact with Source Equipment 11 and supporting it. The "bottom" of an object is the side or surface opposite the top surface and closest to the ground, for example, that side of frame 20 in contact with the ground.

Figure 1:
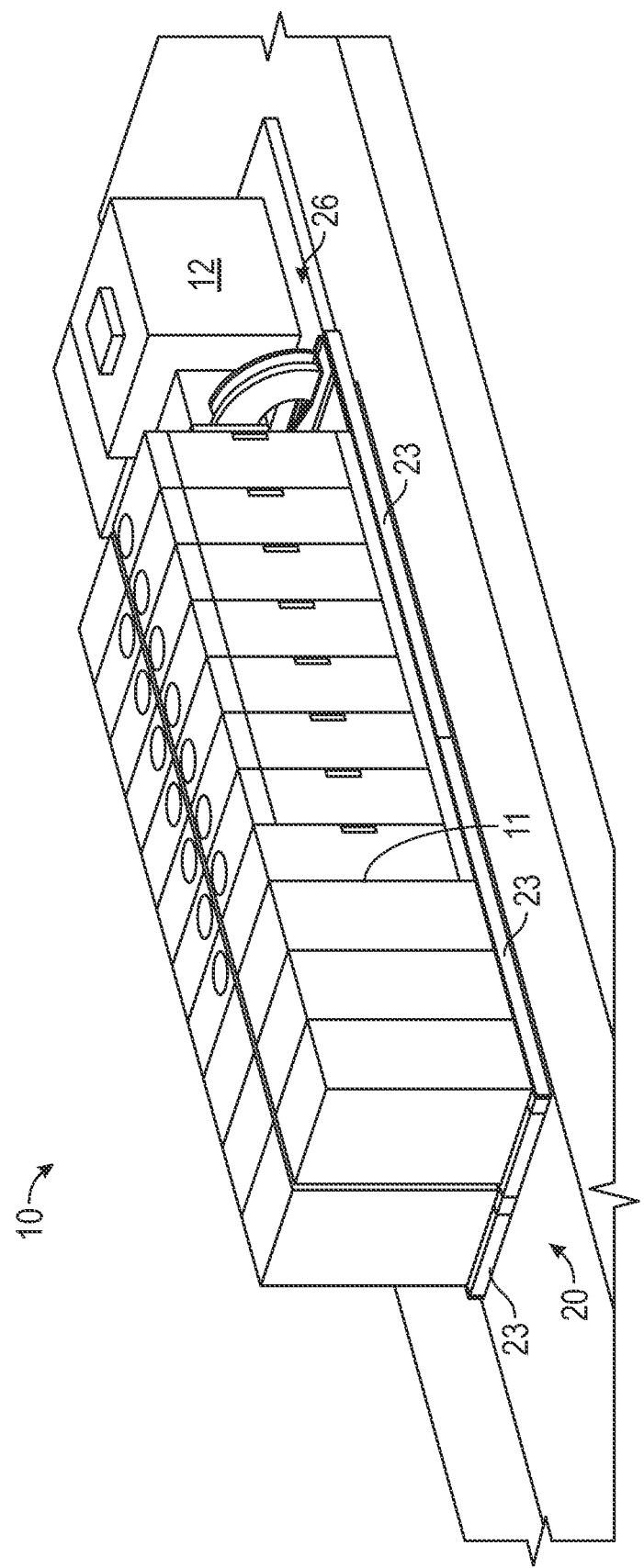
FIG. 1 is an illustration of a perspective view of a completed installation of an assembly according to an embodiment the present invention, showing the assembly serving as the foundation for Source Equipment and connecting it to Destination Equipment.

Referring to the figures, and more particularly FIG. 1, embodiments of the assembly 10 of the present invention comprise frame 20. Preferably, frame 20 is a single unitary object on which all of the necessary components to connect Source Equipment 11 to Destination Equipment 12 are disposed. In this way, assembly 10 can be manufactured and assembled in its entirety prior to delivery to the site of installation and can be quickly transported to the site. As will be described in further detail herein, frame 20 is preferably modular. For example, referring to FIG. 1, frame 20 comprises four frame units 23 assembled together to form frame 20. While frame 20 as illustrated in FIG. 1 comprises four frame units 23, assembly 10 may comprise any number of frame units 23 as may be appropriate for the circumstances of the particular project. In some embodiments, frame 20 comprises only a single frame unit 23.

Figure 2A:
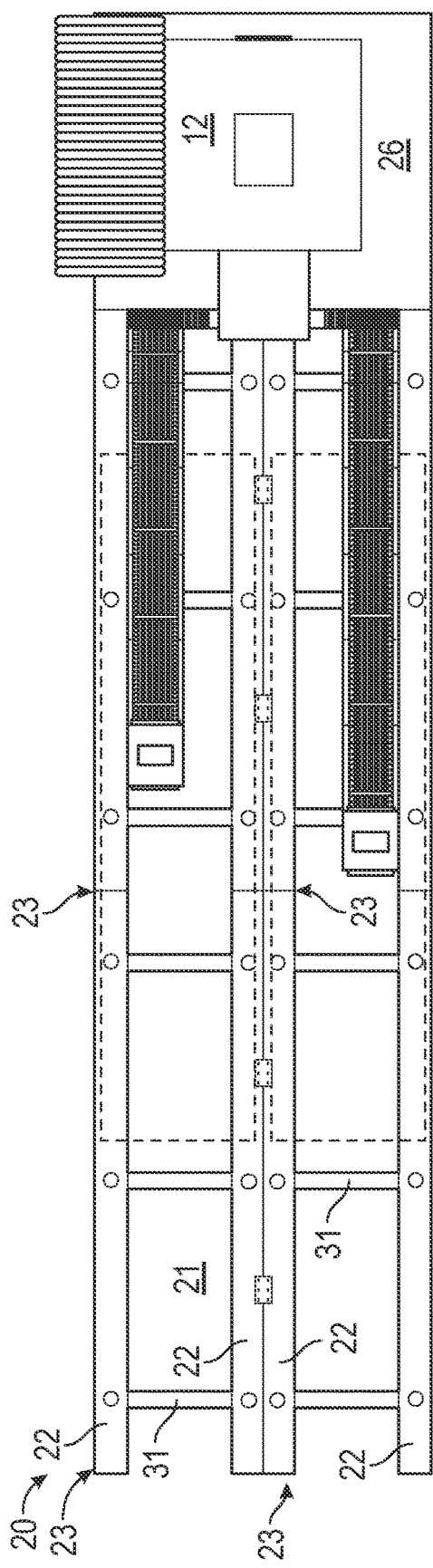
FIGS. 2A-2B are a series of illustrations of top views of assemblies according to embodiments of the present invention, FIG. 2A illustrating an installation plan of an assembly and FIG. 2B illustrating a foundation plan of an assembly.
Figure 2B:
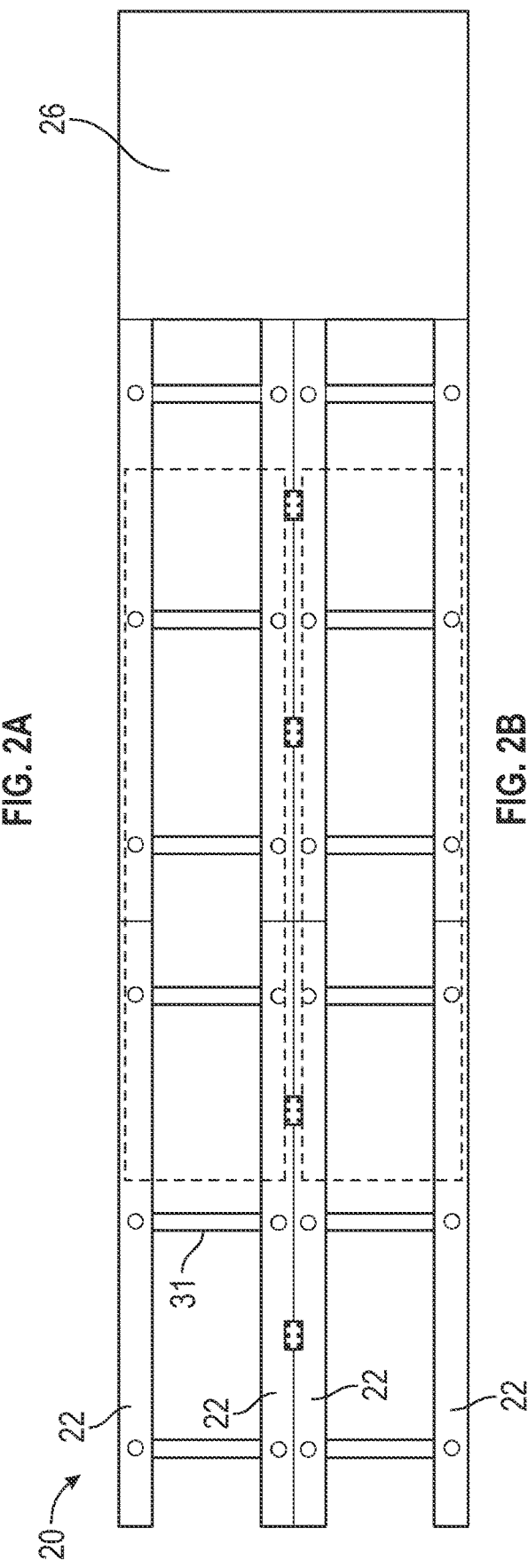

Referring to FIGS. 2A and 2B, frame 20 preferably comprises cavity 21 (sometimes referred to herein as an "air plenum" or "space") between where the Source Equipment 11 will rest on frame 20 and the ground. Preferably, cavity 21 is formed by beams 22 laid substantially parallel to each other and spaced apart from each other to support Source Equipment off of the ground and creating distance between the beams. In one embodiment, cavity 21 is defined by the space between the top and bottom of frame 20 and between beams 22. Preferably, frame unit 23 comprises two beams oriented substantially parallel to each other and joined together by supporting member 31. A first end of frame unit 23 would be that end closest to where it would contact pad 26 of Destination Equipment 12. In this way, the Source Equipment 11 will have cavity 21 at least partially along the entire length and width of the Source Equipment 11. The particular dimensions of frame 20 may vary depending on the intended Source Equipment 11 and Destination Equipment 12, but preferably, the length of each frame unit 23 is such that it can be transported on commercially available vehicles, as described in further detail below. Since frame 20 may comprise any number of frame units 23, each frame unit 23 is preferably the same dimensions as each other frame unit 23, so that they can coordinate for transportation and for standardization in manufacture. In such case, the dimensions of frame 20 can be adjusted by simply adding more frame units 23 to the assembly of frame 20. Frame unit 23 may comprise any number of beams 22 depending on the load and needs of the Source Equipment 11. While it is preferred that frame unit 23 comprises two beams 22 that are parallel to each other to make transportation easier (as will be discussed more thoroughly herein), in some embodiments, beams 22 are not parallel with each other, but directed at angles with respect to each other for different reasons, for example to account for varying load densities of certain Source Equipment 11 or variations in the size of Source Equipment 11. Preferably the beams are pre-engineered structural grade beams formed, extruded or molded from structural-grade materials, including but not limited to steel, reinforced concrete, structural HDPE, etc., and combinations thereof.

Referring to FIGS. 2A and 2B, assembly 10 comprises four frame units 23, each of which comprise two beams 22. Preferably each frame unit 23 is configured in relation to the other so that they form a two-by-two grid. In such a grid, each frame unit 23 has a beam 22 on the "outside" of frame 20 that is not in contact with another frame unit 23, and a second beam disposed on the "inside" or "center" of frame 20 joined together or disposed in contact with another "inside" beam 22 of another frame unit 23. Preferably all these four beams 22 have the same or similar dimensions as each other, which aids in transportation as described more thoroughly below. In this way, the "inside" or "center" beams 22 can together support two different Source Equipments placed side by side, and each of the "outside" beams 22 would each support the opposite sides of a single Source Equipment.

Referring to FIGS. 3A and 3B, frame 20 comprises a mechanical anchoring system 24. In the embodiment shown in FIGS. 3A and 3B, the mechanical anchoring system comprises screws 24 for securing beams 22 to the ground through channels 25 extending from the top through the bottom of each beam 22. In another embodiment, beams 22 are secured directly to the earth by structural earth screws, mechanically connected to drilled structural piers and/or to a steel reinforced concrete pad. Mechanical anchoring system 24 is not limited to screws, but in some embodiments comprises other mechanical securing devices, including but not limited to bolts, rods, anchors, bars, columns, etc.

Referring to FIGS. 4A and 4B, embodiments of the assembly 10 of the present invention comprise at least one cable feeder chassis 30 for guiding and containing cables 32 connecting Source Equipment 11 to Destination Equipment 12. Various embodiments of cable feeder chassis 30 are illustrated in FIGS. 5-10. Preferably, cable feeder chassis 30 is disposed on the top of supporting member 31 of frame 20 and physically anchored to it to create a single unitary assembly of the electronic parts with frame 20. In this way, cable feeder chassis 30 and frame 20 are transportable together and act as a single object. In some embodiments, cable feeder chassis 30 is also supported by frame 20 above the ground by supporting member 31, preferably extending between one beam 22 to the adjacent beam 22 at or near their bottom to support cable feeder chassis 30 from its bottom, as is perhaps best illustrated in FIGS. 3A and 3B. Preferably, cable feeder chassis 30 is disposed on frame 20 such that it does not extend above the top of frame 20 at least along the length of that portion of frame 20 that would support and be in direct contact with Source Equipment 11. In another embodiment, cable feeder chassis 30 is contained entirely or at least partially within beam 22. In another embodiment, cable feeder chassis 30 is removably attachable to beam 22 and/or supporting member 31. Frame unit 23 may comprise any number of supporting members 31 and in any configuration or placement along the length of frame unit 23. While it is preferred that each supporting member 31 extends all the way between beams 22 of a frame unit 23 in order to keep the beams together as an integral unit of frame unit 23, such is not necessary, and in one embodiment, at least one supporting member 31 of a frame unit 23 does not extend all the way from one beam 22 to the other beam 22 of the frame unit.

Source Equipment 11 may have power or cable needs at various locations along its length. Typically, Source Equipment 11 receives cables from its bottom. Accordingly, as perhaps best illustrated in FIGS. 4A-7, in some embodiments of the present invention, cable feeder chassis 30 comprises cable outlets 35 at various locations along the length of cable feeder chassis 30 to permit cables 32 to enter or exit cable feeder chassis 30. Not all frame units 23 of assembly 10 must comprise cable feeder chassis 30. For example, referring to FIG. 4B, the two frame units 23 closest to Destination Equipment 12 each comprise cable feeder chassis 30, but the two frame units furthest from Destination Equipment 12 do not comprise cable feeder chassis 30. Presumably, in this particular embodiment, Source Equipment 11 only needs to receive cables at locations that would correspond with the two frame units closest to Destination Equipment 12.

Figure 5:
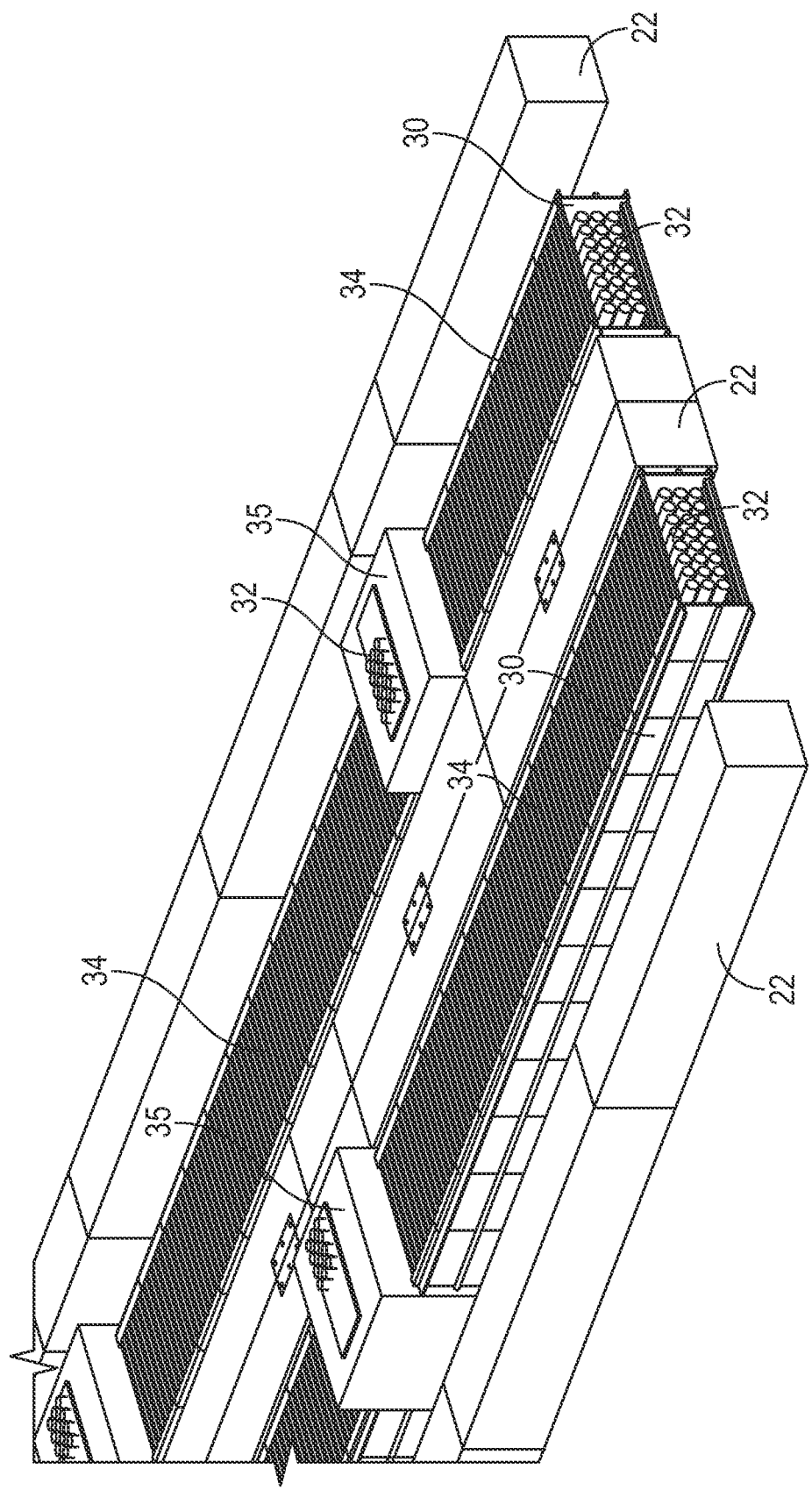
FIG. 5 is an illustration of a perspective view of an assembly according to an embodiment of the present invention with the cables covered.
Figure 6:
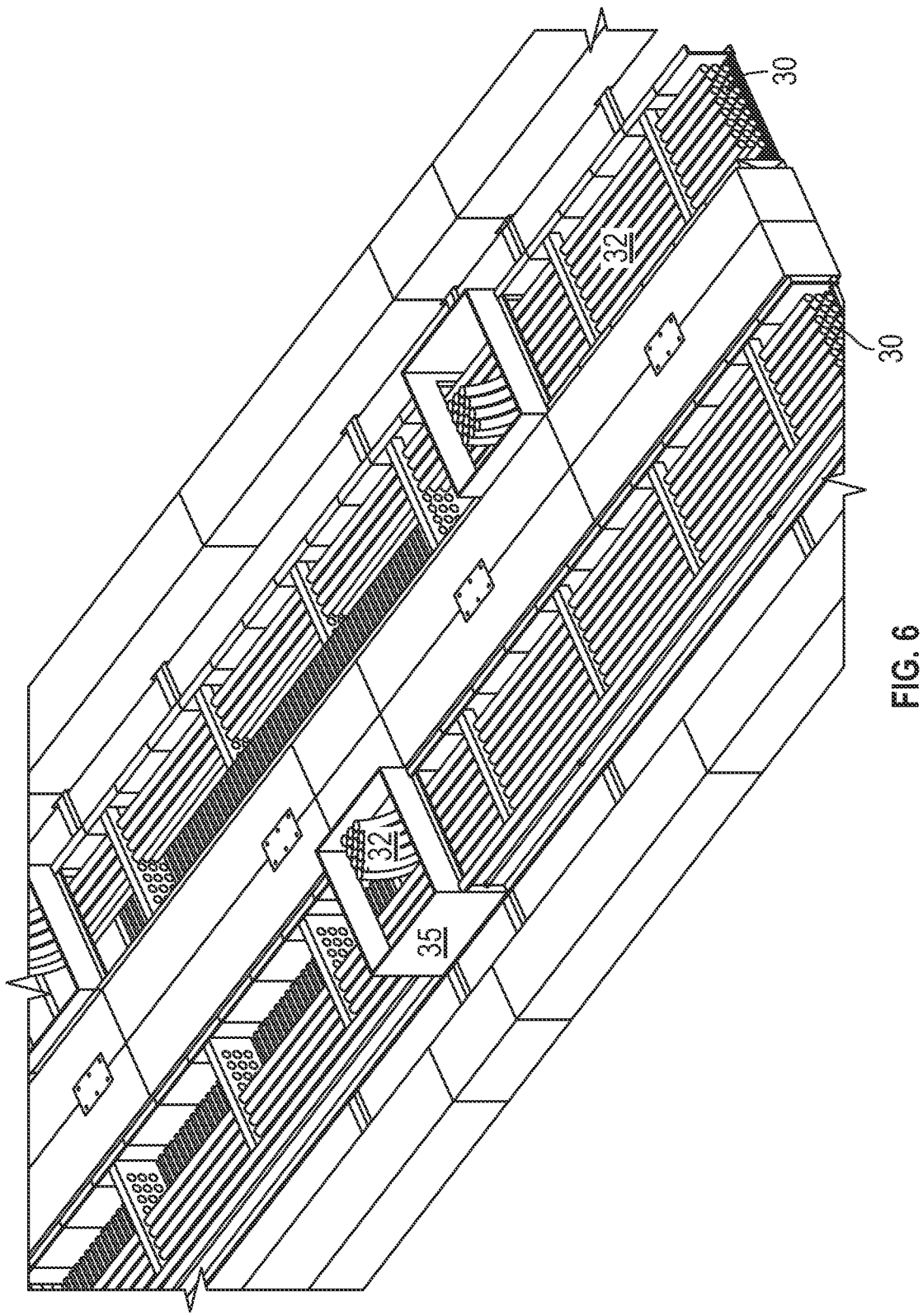
FIG. 6 is an illustration of a perspective view of an assembly according to an embodiment of the present invention with the cables exposed.

Cable feeder chassis 30 is preferably disposed on frame 20 between beams 22 to take advantage of the airflow in cavity 21 formed by the spacing of beams 22. Cables 32 preferably carry electricity and/or information that may create heat that needs to be managed. To protect and organize cables 32, cables 32 are preferably contained within cable feeder chassis 30. Embodiments of the present invention employ air ventilation to manage the heat in cables 32. Various features are provided to aid in ventilation of cable feeder chassis 30. Referring to FIG. 5, grates 34 are disposed on at least one side of cable feeder chassis 30, preferably on the top and bottom of cable feeder chassis 30. Preferably, grates 34 are placed on both the top and bottom sides of cable feeder chassis 30 to permit airflow entirely through cable feeder chassis 30 and to prevent water build up within the chassis. Referring to FIG. 6, a plurality of cables 32 are contained within cable feeder chassis 30 in a plurality of rows and layers. Certain selected cables 32 exit cable feeder chassis 30 through a certain outlet 35, the cables 32 exiting cable feeder chassis 30 at any particular outlet 35 depending on the needs of the Source Equipment. The number of cables 32 contained within cable feeder chassis 30, the configuration of cables 32 within cable feeder chassis 30, the location and placement of outlets 35 and the selection of which of cables 32 that exit a given outlet 35 are all features that may vary between embodiments of the present invention depending on the particular Source Equipment. Cable feeder chassis 30 is preferably sized to accommodate all of the cabling associated with the electrical equipment connecting Source Equipment 11 with Destination Equipment 12 and is preferably maximized for air ventilation to be "free-air rated" as set forth by the National Electric Code.

Figure 7:
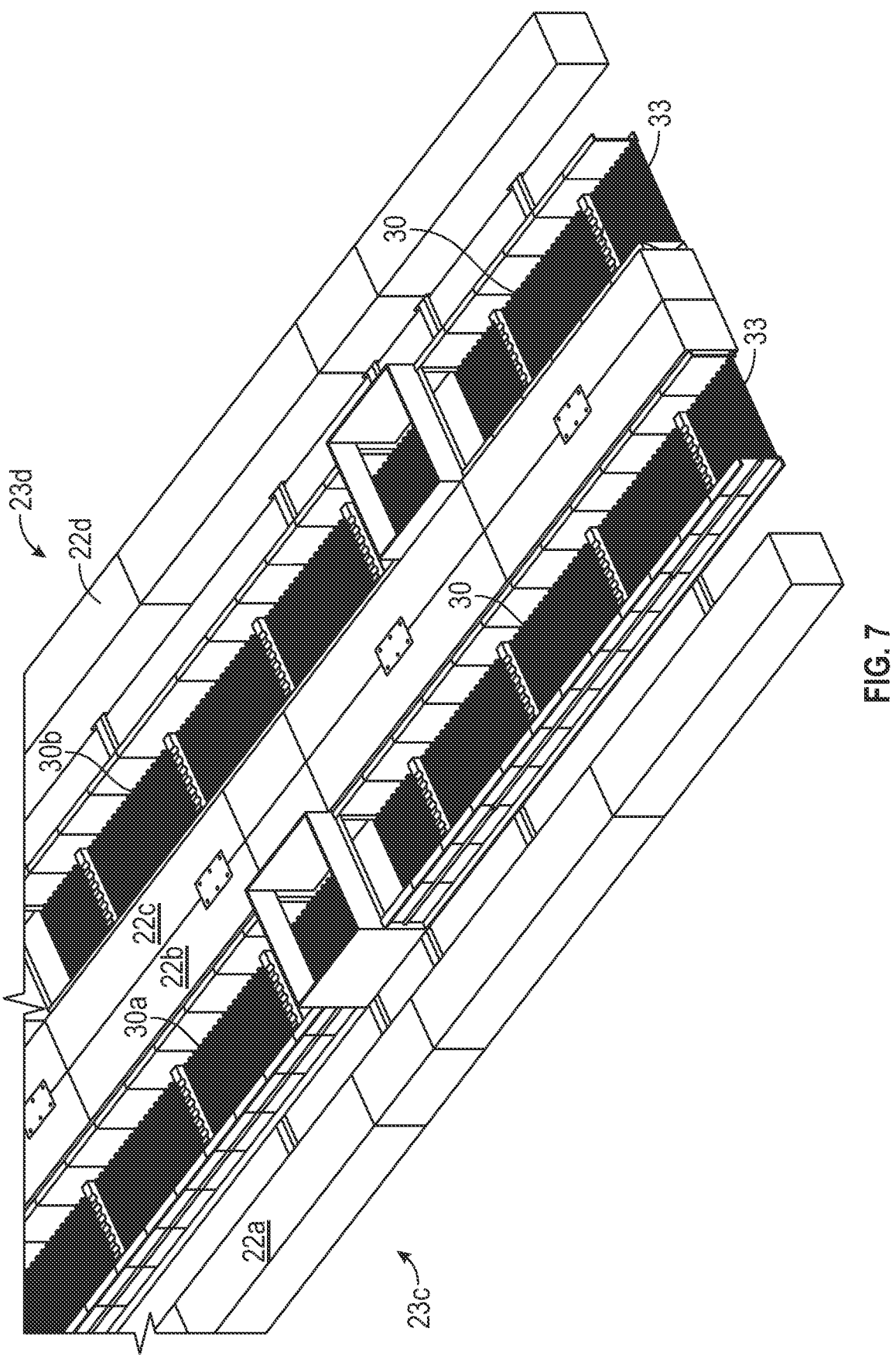
FIG. 7 is an illustration of a perspective view of an assembly according to an embodiment of the present invention without cables.
Figure 8:
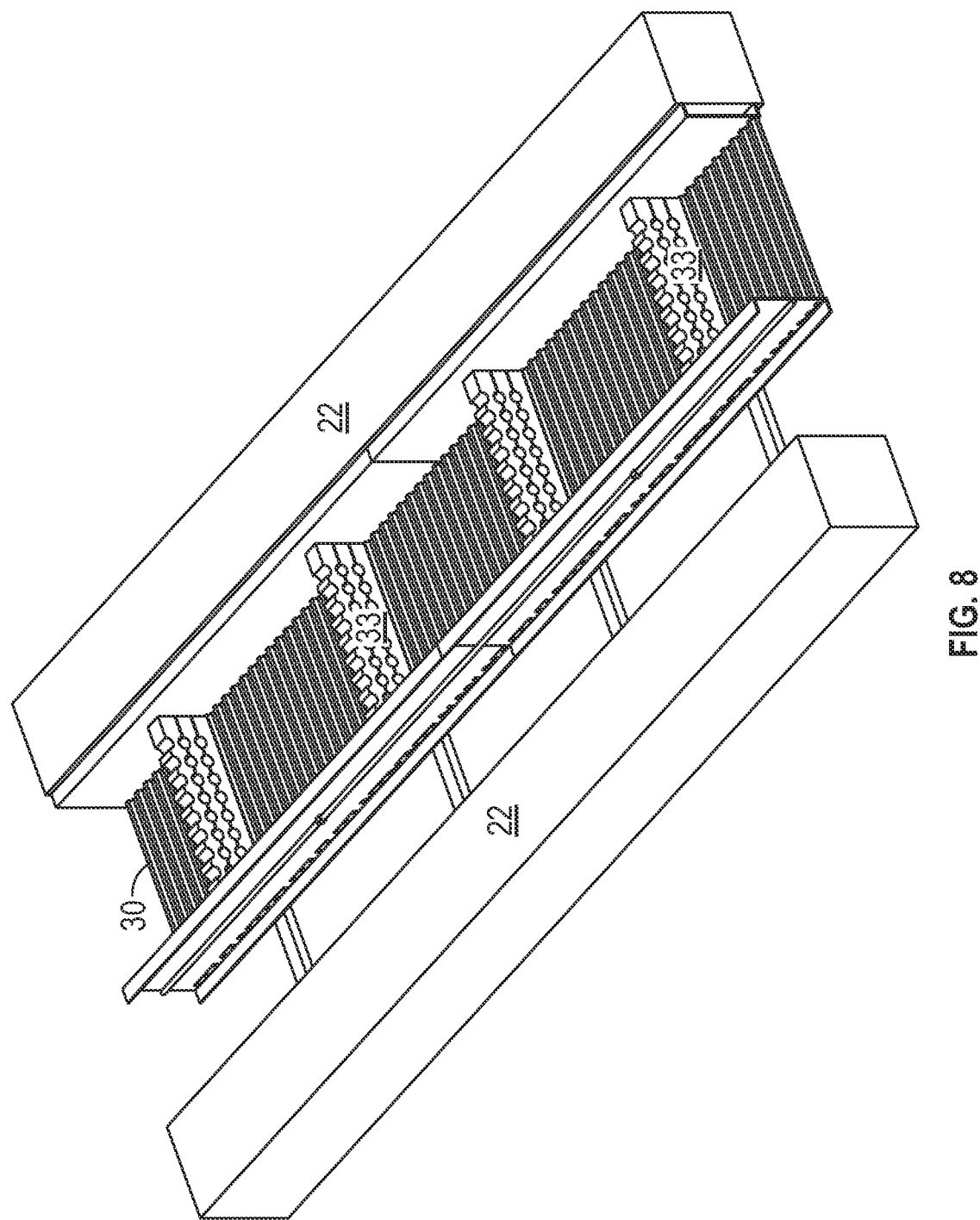
FIG. 8 is an illustration of a perspective view of a portion of an assembly according to an embodiment of the present invention without cables.
Figure 9:
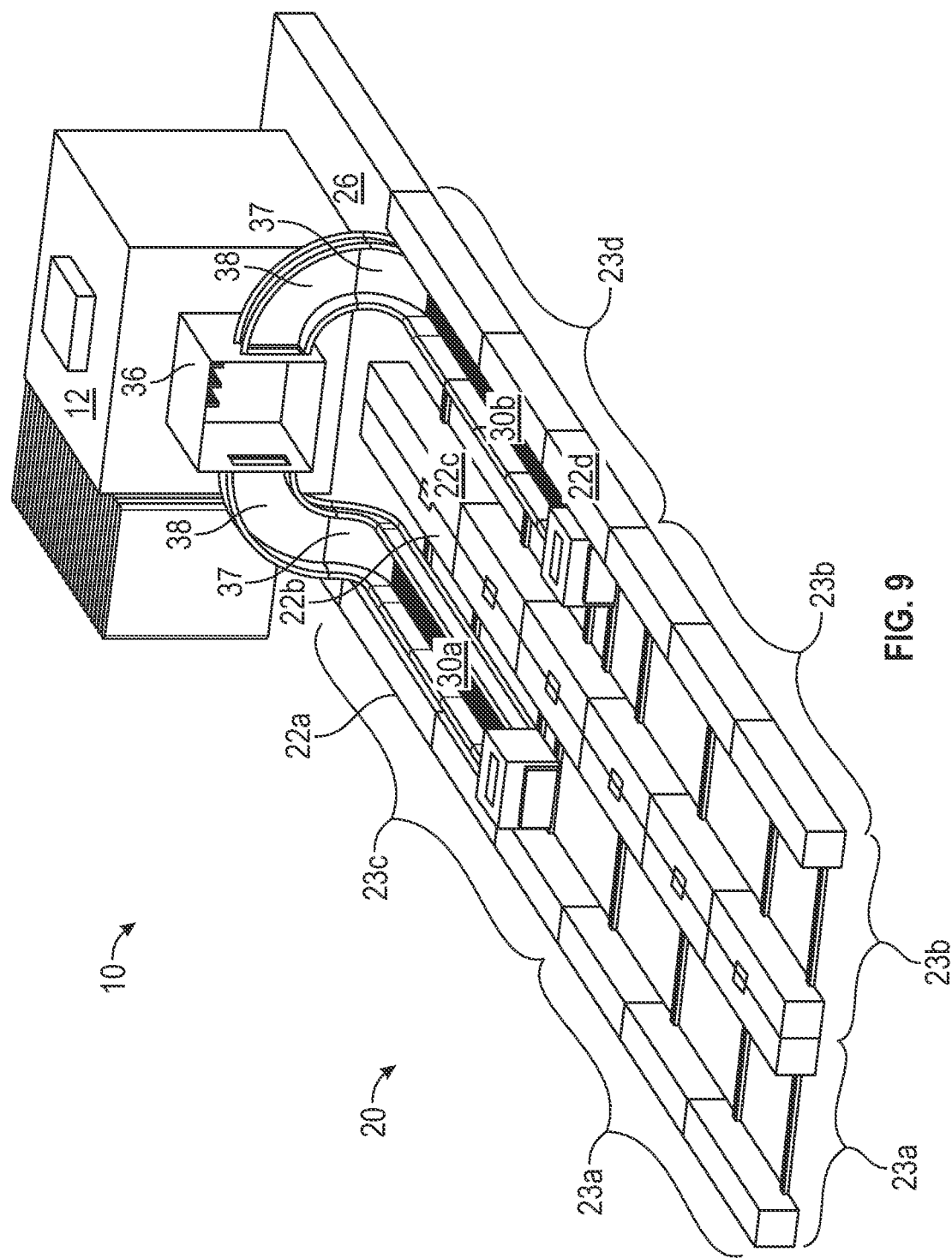
FIG. 9 is an illustration of a perspective view of an assembly according to an embodiment of the present invention with Destination Equipment.

As perhaps best illustrated in FIGS. 7 and 8, cable feeder chassis 30 preferably comprises a plurality of cable spacers 33 to secure and maintain the spacing between cables 32. Cable spacer 33 preferably comprises a rigid material shaped to hold each individual cable 32 separate from the other, for example, a strip or rectangular shaped material with curved or indented impressions on its top side and/or bottom side, the curves or indentations comprising a diameter or width about at least as large as the diameter of the intended cable 32. In another embodiment, as illustrated in FIG. 8 for example, a first cable spacer 33 with curved indentations on both its top and bottom sides, is stacked on top of a second and a third cable spacer with similar coordinating curved indentations so as to create supports for multiple levels of cables 32 one on top of the other but spaced apart, as perhaps best illustrated in FIG. 5. In another embodiment, cable spacer 33 comprises a pronged device attached to cable feeder chassis 30 on one end and pinching cable 32 at or near its other end. In another embodiment, cable spacer 33 comprises a structure with a hole through which cable 32 passes. In another embodiment, cable spacer 33 comprises a tether, rope, string, wire or other securing device.

In some embodiments, Destination Equipment 12 receives cables 32 at a location above the plane of frame 20. In such cases, cable feeder chassis 30 is preferably shaped and oriented to direct cables 32 from the plane of frame 20 beneath Source Equipment 11 up to where Destination Equipment 12 receives cables 32. As perhaps best illustrated in FIG. 9, cable feeder chassis 30 comprises a curved shape upward at or near pad 26 to direct cables 32 above the plane of frame 20 and into Destination Equipment 12 and/or into a Destination Equipment cable receiving enclosure 36. To aid in the modularity of assembly 10, the curved portion of cable feeder chassis 30 that directs cables 32 above the plane of frame 20 may be an independent object in itself that is removably securable to cable feeder chassis 30, which object is referenced in FIG. 9 as cable elevator 37. In some embodiments, cable elevator 37 coordinates with and is removably securable to cable channels 38 on Destination Equipment 12. In the embodiment illustrated in FIG. 9, cable channels 38 are curved to direct cables 32 from cable feeder chassis 30 into the center of Destination Equipment 12 elevated above the plane of frame 20. Receiving enclosure 36 and cable channels 38 preferably comprise similar ventilation features as cable feeder chassis 30, including but not limited to grates 34 and cable spacers 33.

Figure 10:
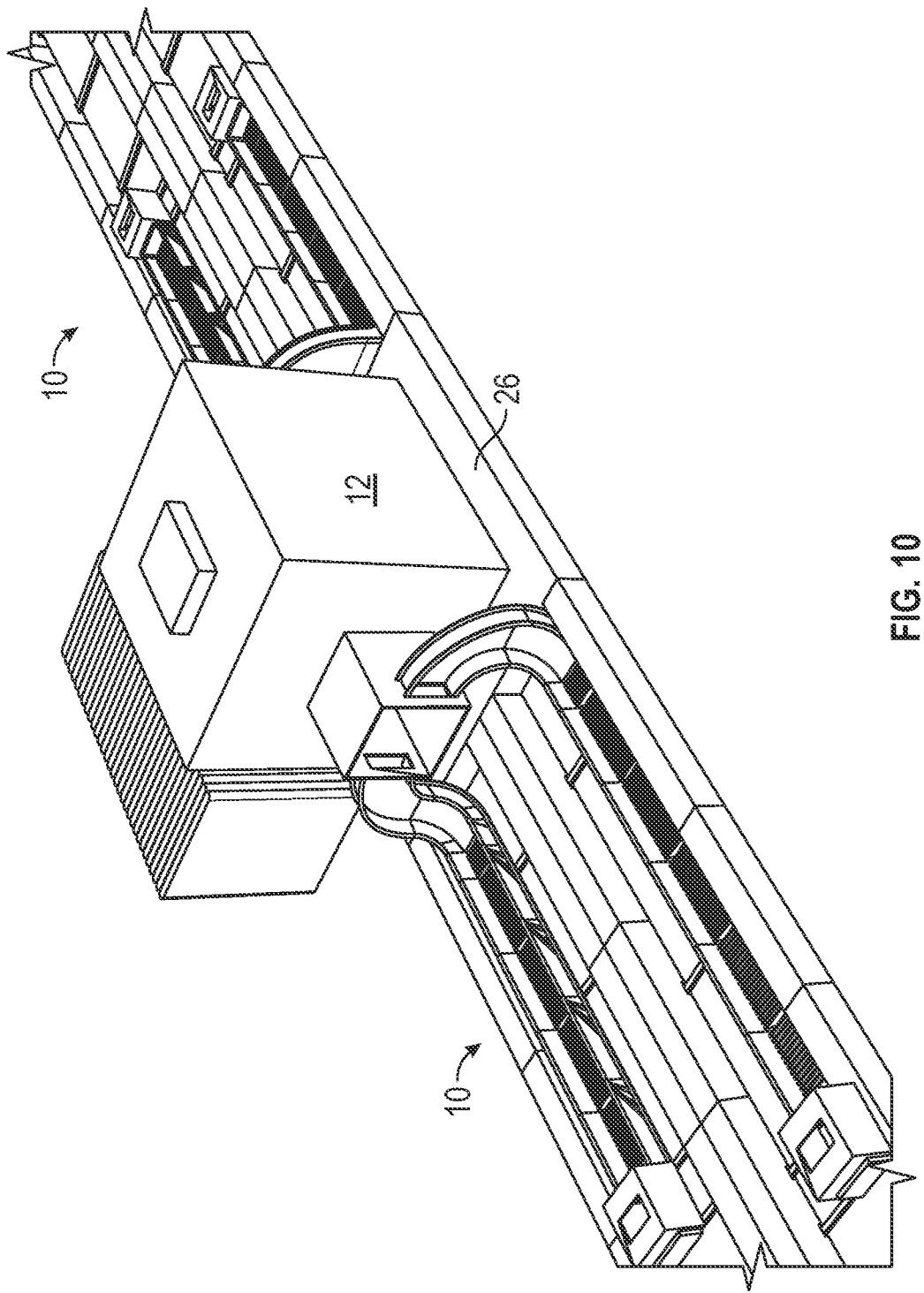
FIG. 10 is an illustration of a perspective view of two assemblies according to an embodiment of the present invention with Destination Equipment.
Figure 11:
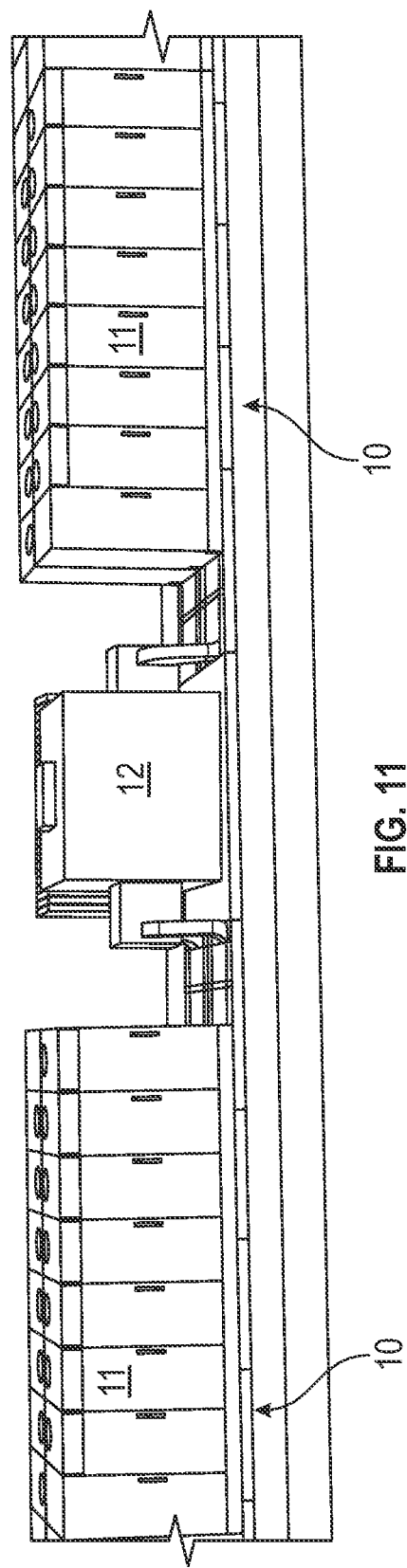
FIG. 11 is an illustration of a side view of two assemblies as used with a plurality of Source Equipments and a Destination Equipment according to an embodiment of the present invention.

More than one assembly 10 may be coordinated together to connect multiple Source Equipments 11 to a Destination Equipment 12 or more than one Destination Equipment 12. For example, as illustrated in FIG. 10, first assembly 10 and second assembly 10 are both connected to the same Destination Equipment 12, first assembly 10 located on a first side of the Destination Equipment 12 and second assembly 10 located on a second side of Destination Equipment 12 opposite the first side, such that first assembly 10 and second assembly 10 are in the same plane and parallel to or along the same axis as each other. FIG. 11 illustrates the configuration illustrated in FIG. 10 but additionally illustrating a plurality of Source Equipment 11. Other configurations are possible, for example, in another embodiment, third assembly 10 is connected to third side of Destination Equipment 12, the primary axis of the third assembly being perpendicular to the primary axis of the first and second assemblies 10. Source Equipment can be installed stand-alone, back-to-back, side-by-side, or on opposing sides of Destination Equipment 12. In these ways, various arrays of assemblies 10 can be configured to provide the desired capacity of energy storage.

Figure 12:
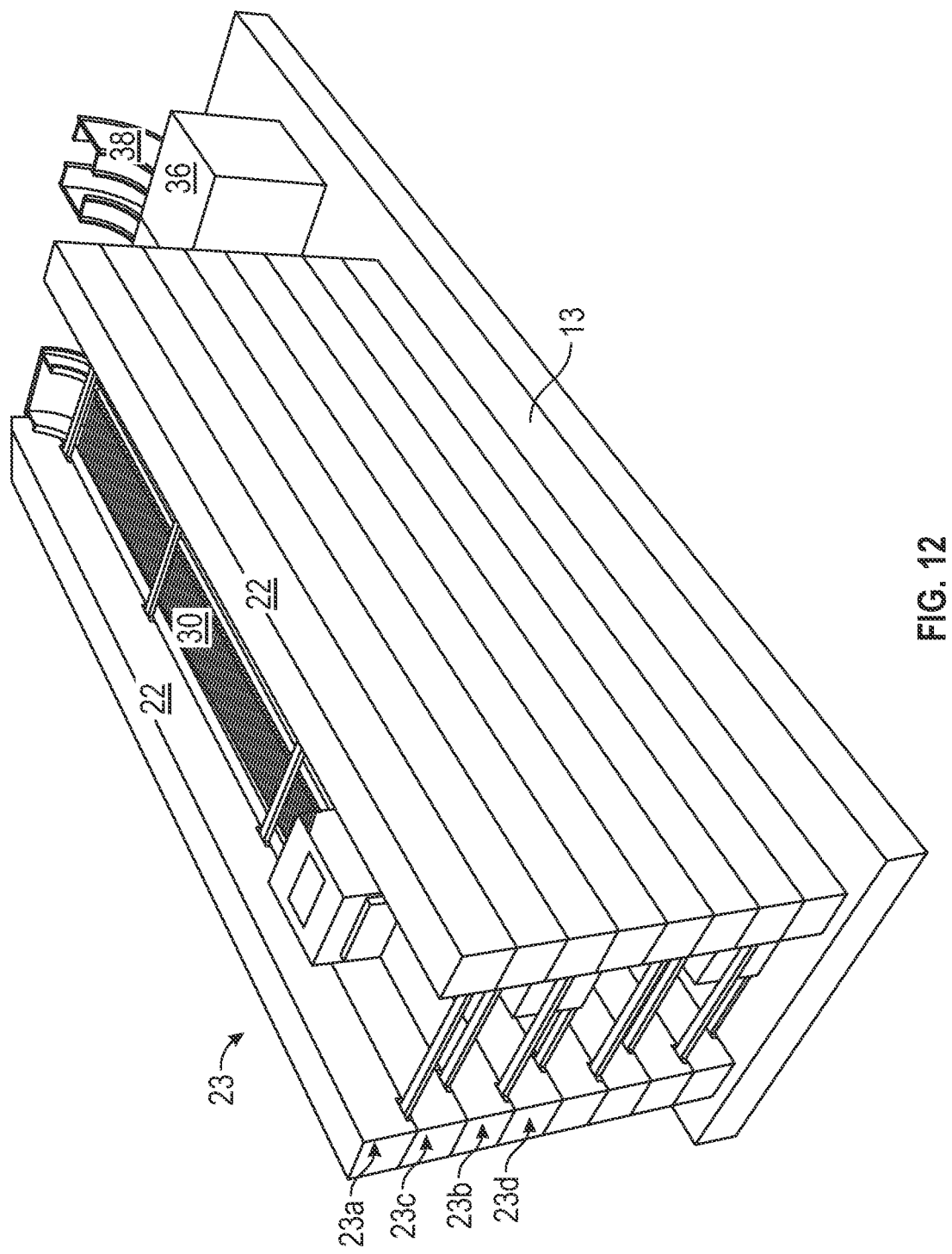
FIG. 12 is an illustration of a perspective view of a plurality of assemblies modularized and configured for transportation according to an embodiment of the present invention.
Figure 13:
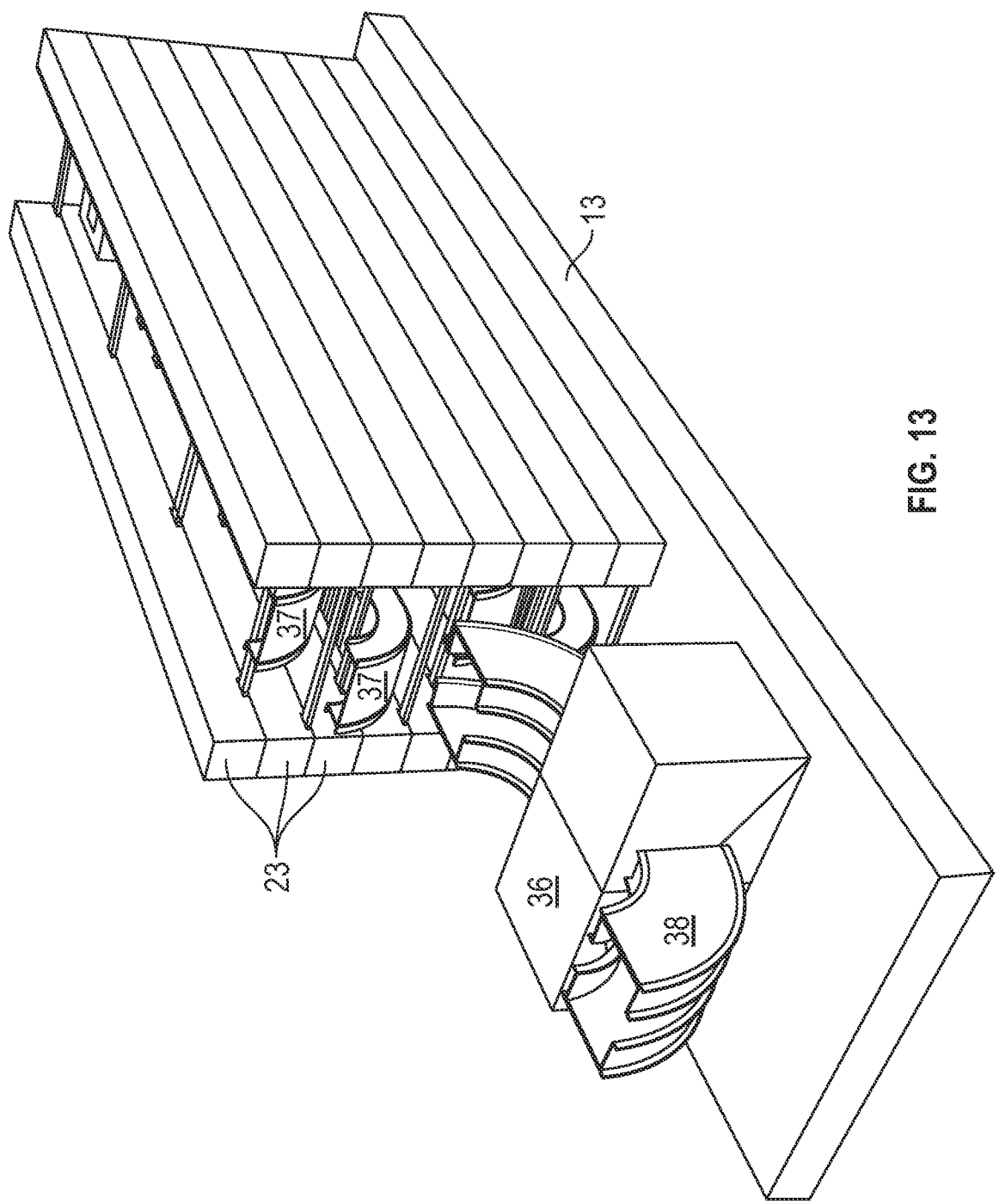
FIG. 13 is an illustration of a perspective view of a plurality of assemblies configured for transportation according to an embodiment of the present invention.
Figure 14:
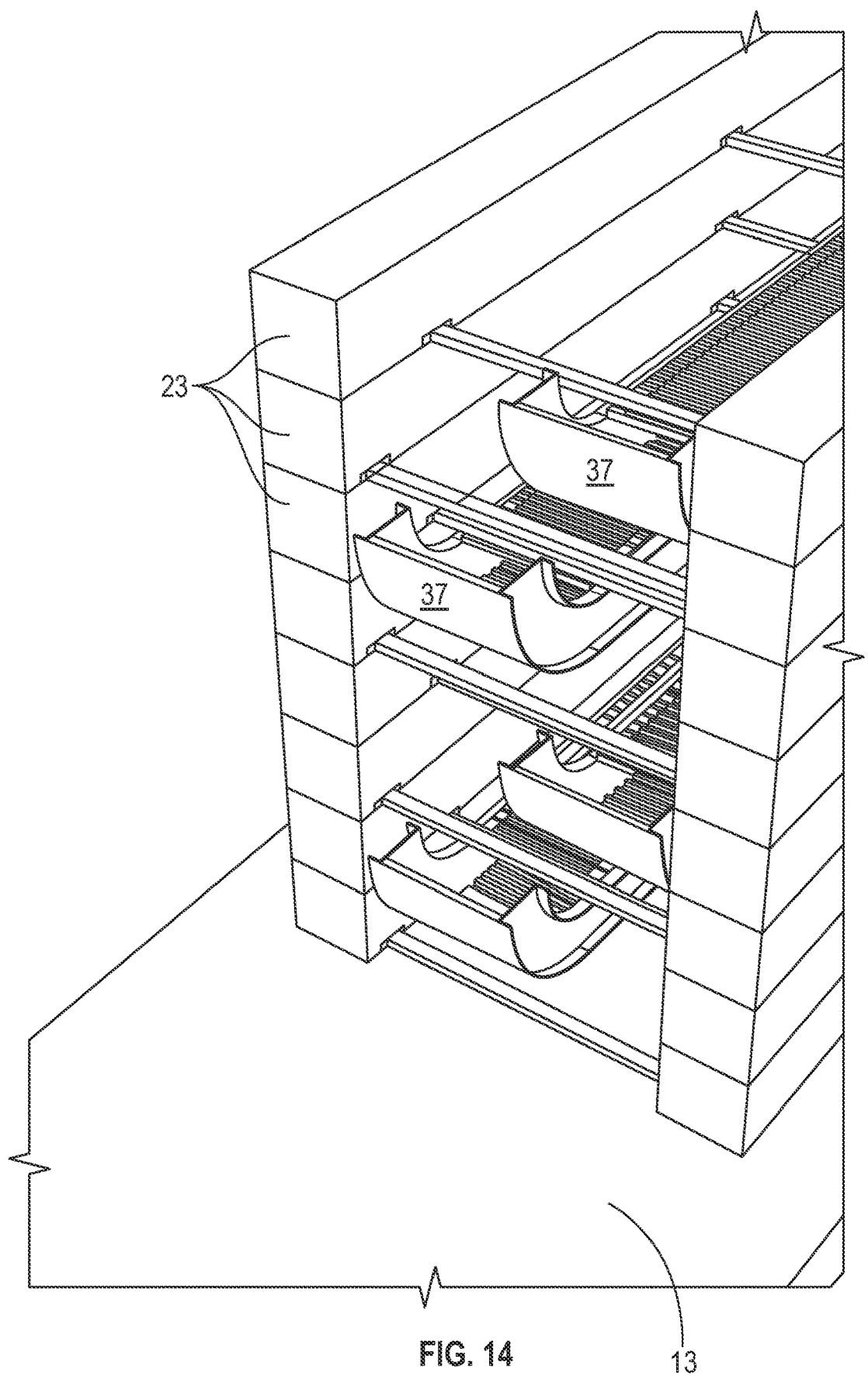
FIG. 14 is an illustration of a perspective view of a portion of a plurality of assemblies configured for transportation according to an embodiment of the present invention.

Embodiments of assembly 10 of the present invention are preferably modular so that they are able to be transported without special permits or unnecessarily sized vehicles. Preferably, frame unit 20 is stackable so that a plurality of frame units 20 can be stacked one on the other on a transportation vehicle 13. FIGS. 12-14 illustrate an example of how assemblies 10 can be modularized, stacked and transported on a truck bed of vehicle 13 according to an embodiment of the present invention. As illustrated in FIGS. 12-14, beams 22 of a pluralities of assemblies 10 are grouped and/or integrally formed as modular frame units 23, each modular frame unit 23 preferably comprising at least two beams 22 or at least two portions of two beams 22. Each modular frame unit 23 need not have cable feeder chassis 30 because not all portions of the beams are supporting or are in contact with cable feeder chassis 30. Accordingly, a first modular frame unit 23 preferably does not have cable feeder chassis 30 and a second modular frame unit 23 does have cable feeder chassis 30, so that a plurality of modular frame units 23 can be stacked one on top of the other.

To aid in stackability and modularity, embodiments of assembly 10 are directed to particular placements of cable feeder chassis 30 on particular frame units 23. For example, referring to FIG. 9, preferably a single assembly 10 comprises four modular frame units 23, the first and second of the modular frame units not comprising a cable feeder chassis 30 and the third and fourth comprising cable feeder chassis 30. A single assembly 10 comprises four frame units 23, each frame unit 23 referenced individually in FIG. 9 as 23a, 23b, 23c and 23d. Preferably first cable feeder chassis 30a is disposed on frame unit 23c between the frame unit's inside beam 22b and its outside beam 22a, cable feeder chassis 30a attached to, in contact with or otherwise placed closer to outside beam 22a. Also, preferably second cable feeder chassis 30b is disposed on frame unit 23d between the frame unit's inside beam 22c and its outside beam 22d, cable feeder chassis 30b attached to, in contact with or otherwise closer to outside beam 22d. Referring to FIGS. 12-14 and more particularly FIG. 12, two assemblies 10 are coordinated for transporting on transportation vehicle 13, all four modular frame units 23 stacked one on top of the other in the following order from top to bottom: 23a, 23c, 23b, and 23d. A second assembly 10 is stacked in the same order below that. Preferably the stacking of frame units 23 is accomplished in this specific order, to maximize use of the space and coordinate the orientation of any vertically oriented parts, such as cable outlets 35 and cable elevator 37 that project above the top of frame unit 23, that may interfere with the stacking.

It should be noted that the present invention does not require the particular placement of cable feeder chassis 30 described in the previous paragraph. Referring to the embodiments of assembly 10 illustrated in FIGS. 5-8, and more particularly FIG. 7, first cable feeder chassis 30a is attached to, in contact with or otherwise closer to inside beam 22b of a first frame unit 23c, and second cable feeder chassis 30b is attached to, in contact with or otherwise closer to inside beam 22c of a second frame unit 23d.

Referring to FIGS. 12-14, Destination Equipment cable receiving enclosure 36 and its associated cable channel 38 of each assembly 10 are preferably placed adjacent to each other on the transportation vehicle 13. In this way, and assuming all these components of assembly 10 are sized appropriately, then at least two assemblies 10 can be transported on transportation vehicle 13 without the need for a special oversized transportation permit.

In another embodiment, the dimensions of beams 22 are such that any modular frame unit 23 can be stacked one on the other whether or not the beams have cable feeder chassis 30 to it, and can be stacked in any order.

Embodiments of assembly 10 according to the present invention are illustrated in FIGS. 15A-21. FIGS. 15A-15B illustrate an installation plan view for various components of frame 20. Referring to FIGS. 15A and 15B, this embodiment of assembly 10 comprises braces 54 extending between the beams 22 of frame 20, which are preferably steel tubes. Cable feeder chassis 30 preferably comprises HDPE conduit for cables 32.

FIGS. 16A-16B illustrate a foundation plan of a particular embodiment of assembly 10, illustrating the particular preferred locations where each of the Source Equipments will be placed on frame 20. Preferably frame 20 is formed with reinforcing bars within it and/or rebar.

Figure 17:
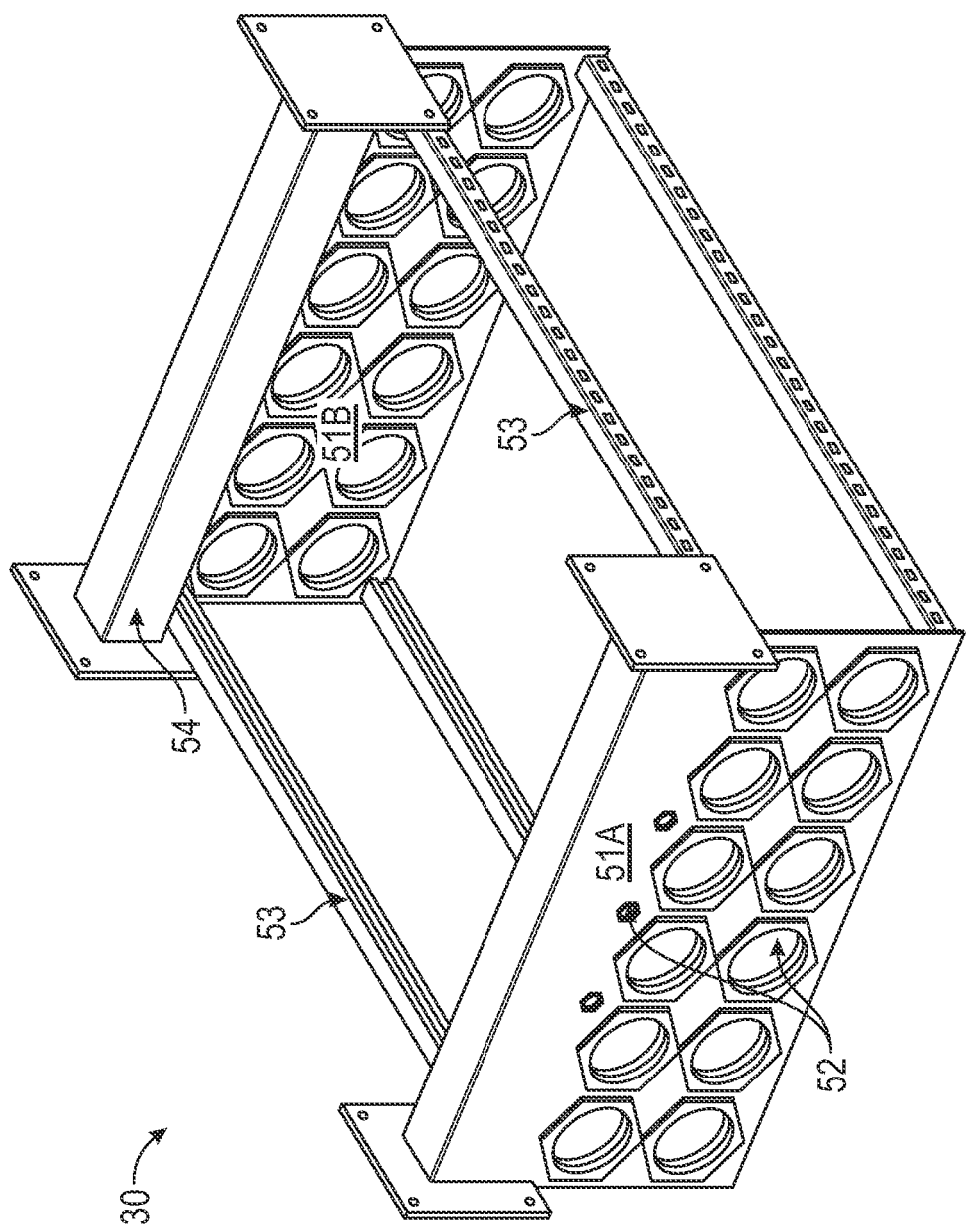
FIG. 17 is an illustration of a perspective view of a cabling chassis according to an embodiment of the present invention.

FIG. 17 illustrates an embodiment of cable feeder chassis 30. Preferably, cable feeder chassis 30 comprises at least two cable plates 51 (the two individual cable plates illustrated in FIG. 17 being individually labelled as 51a and 51b), each cable plate 51 comprising at least one conduit 52. Preferably, first cable plate 51a and second cable plate 51b are oriented such that their primary axes are parallel to each other and conduits 52 are disposed on plates 51 such that a path of cable 32 can pass through both a conduit 52 on first cable plate 51a and a conduit 52 on second cable plate 51b. Conduit 52 preferably comprises HDPE conduit couplings or bushings. If conduit 52 is not intended to be used, conduit 52 comprises a plug. To support cable plates 51, cable feeder chassis 30 preferably comprises struts 53 extending between cable plates 51. To provide additional support, cable feeder chassis 30 preferably comprises braces 54 extending along each cable plate 51 to secure it to beam 22 or other part of frame 20.

Figure 18A:
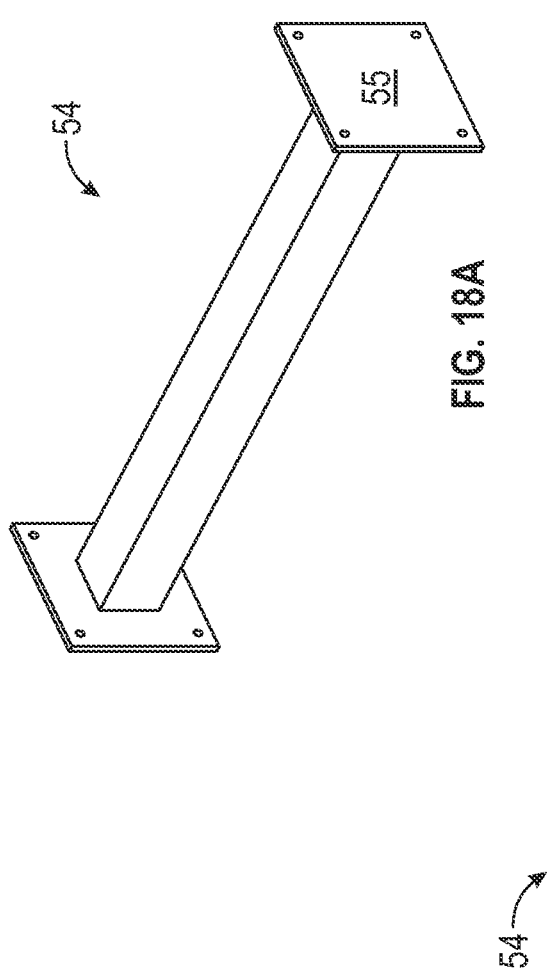
FIGS. 18A-18B are a series of illustrations of the braces according to an embodiment of the present invention, FIG. 18A illustrating a perspective view of a brace and FIG. 18B illustrating two different views of the brace for purposes of showing the brace's dimensions.
Figure 18B:
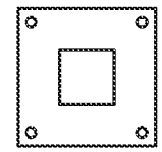

FIGS. 17-18B illustrate preferred dimensions of brace 54 for the embodiment of assembly 10 illustrated in FIGS. 15A-21. Brace 54 is preferably formed of steel and comprises flanges 55 to attach to beams 22.

Figure 19A:
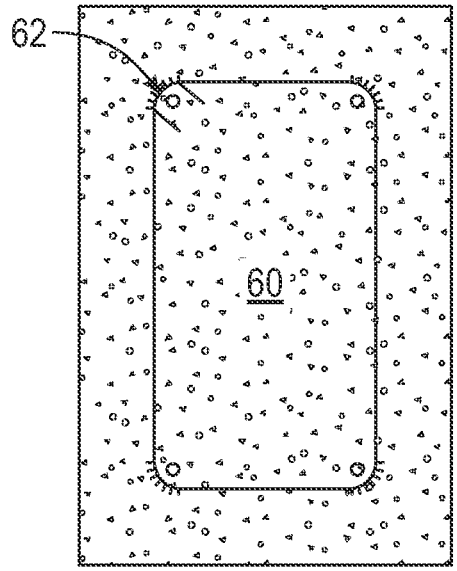
FIGS. 19A-19B are a series of illustrations of sectional views of typical concrete foundation sections according to an embodiment of the present invention, FIG. 19A illustrating the outer foundation section and FIG. 19B illustrating the center foundation section.
Figure 19B:
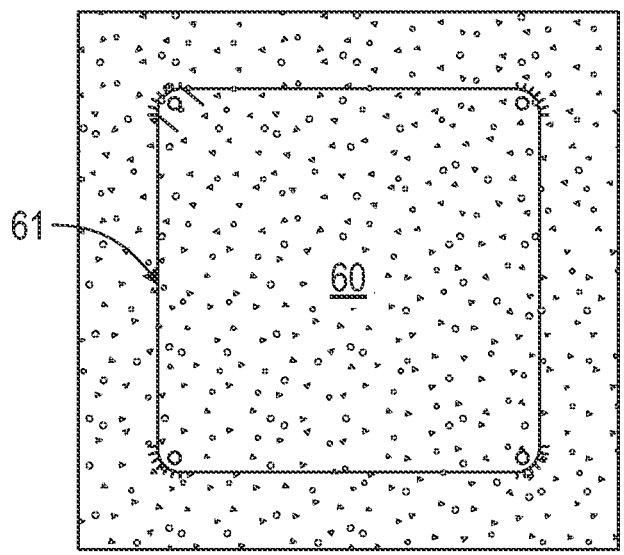
Figure 20:
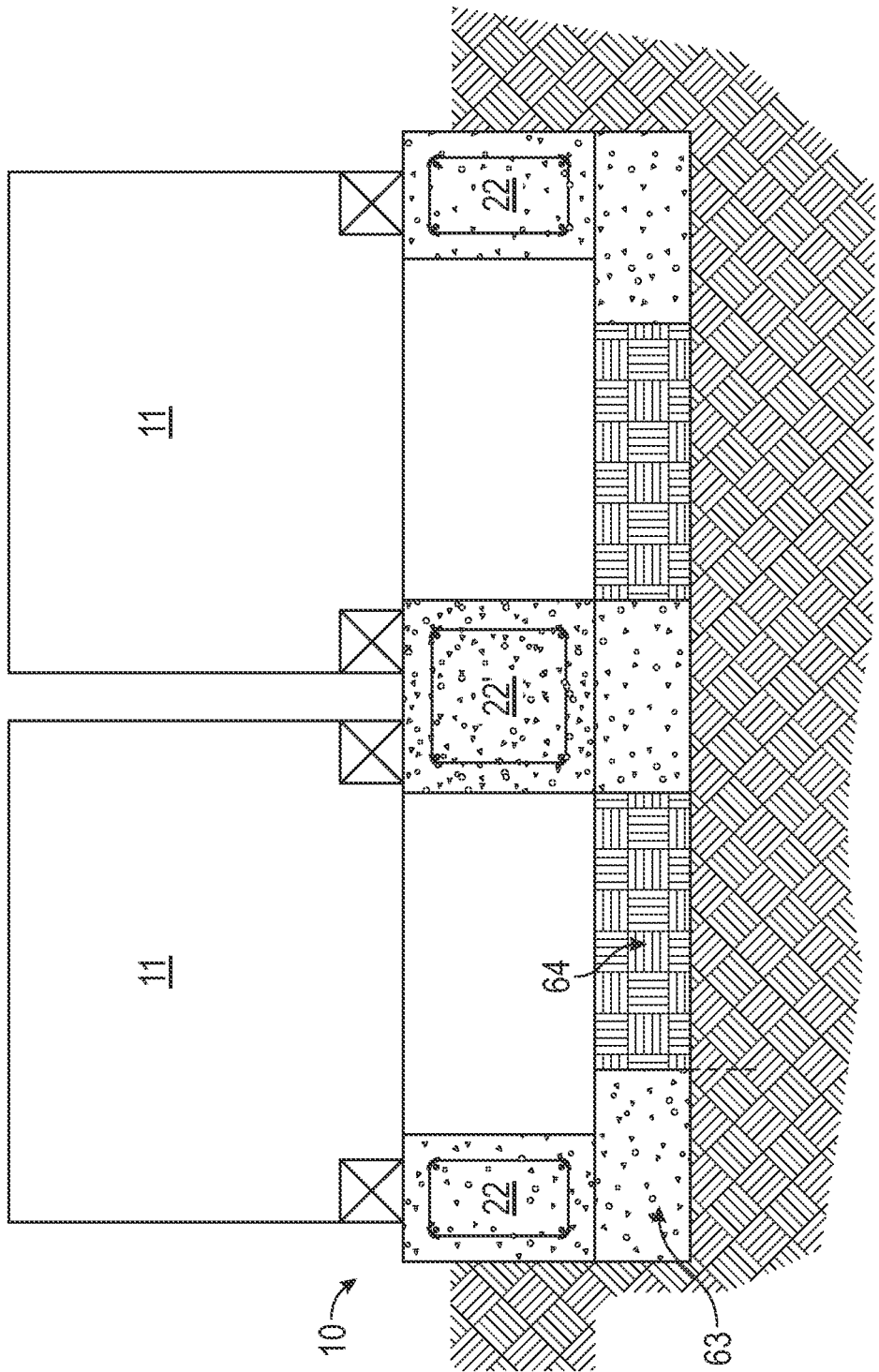
FIG. 20 is an illustration of a cross section from a front view of an assembly according to an embodiment of the present invention.

In another embodiment, beams 22 preferably comprise cement 60. Referring to FIGS. 19A and 19B illustrating cross-sectional views of beams 22, beams 22 are preferably reinforced internally with reinforcement 61, including but not limited to rebar, that is preferably a rectangular tube continuous along the length of beams 22. In one embodiment, reinforcement 61 comprises hook alternate corners 62. Beam 22 of FIG. 19A is an "outer" beam, that is, it is the outside beam of the two beams of a frame unit 23, and is in contact with and/or supporting a single Source Equipment 11. Beam 22 of FIG. 19B is a "center" beam supporting portions of at least two Source Equipment 11. Referring to FIG. 20, in this embodiment, center beam 22' is actually a single unitary object rather than two separate beams 22 as shown in the embodiments of FIGS. 1-14. Other examples of a single unitary "center" beam are illustrated in FIGS. 15A-16B.

In some embodiments, the ground below assembly 10 is prepared to support assembly 10. FIG. 20 illustrates a layout of beams 22 between Source Equipment 11 and a preferred preparation of the ground below assembly 10. In some embodiments, the ground comprises a crushed concrete base 63 below at least each of beams 22 and compacted soils 64 therebetween. In some embodiments, beams 22 rest at a depth below ground level.

Figure 21:
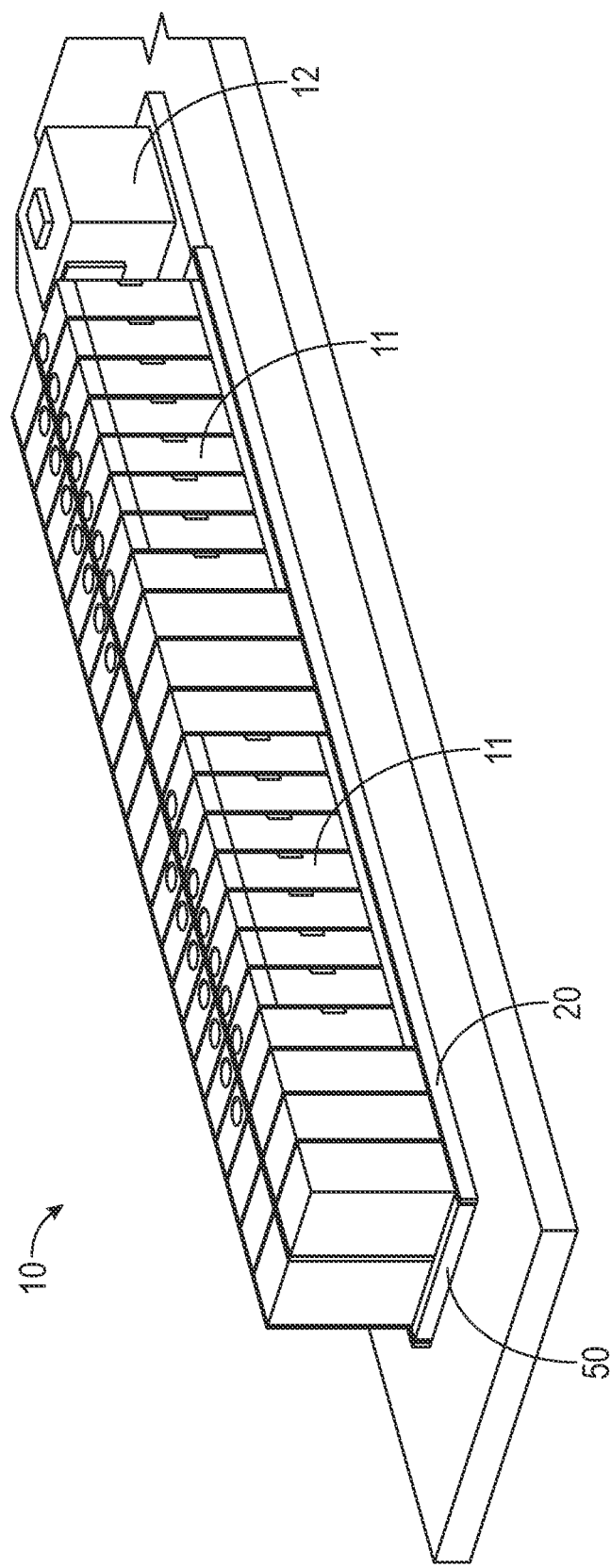
FIG. 21 is an illustration of a completed installation of an assembly according to an embodiment of the present invention.

FIG. 21 illustrates an embodiment of assembly 10 comprising a plurality of Source Equipment 11, wherein frame 20 comprises a plurality of frame units 23 formed in a grid at least as large as Source Equipment 11. In another embodiment, assembly 10 comprises end caps 50 to prevent the natural elements from entering below assembly 10. Referring to FIG. 21, end caps 50 preferably comprise a steel plate disposed at the second end of frame 20 extending between beams 22, and preferably extending between the beams so as to entirely enclose off the space between the beams to enclose cavity 21.

Figure 22:
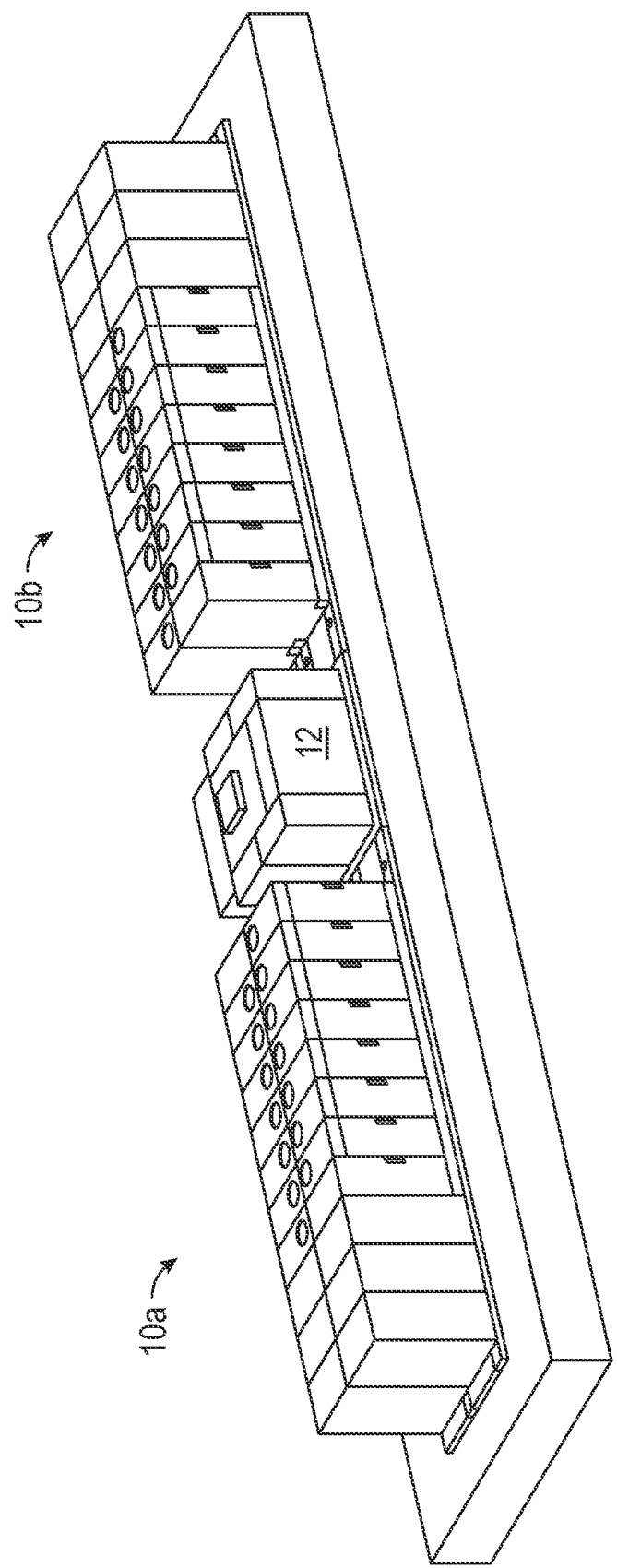
FIG. 22 is an illustration of a perspective view of an embodiment of the present invention comprising two assemblies for use with a single Destination Equipment and a plurality of Source Equipment.

FIGS. 22-25 illustrate various details and components related to Destination Equipment 12 according to an embodiment of the present invention. Referring to FIG. 22, an embodiment of the present invention comprises a single Destination Equipment 12 and two assemblies 10 (each labelled individually as 10a and 10b), a first assembly 10a on a first side of Destination Equipment 12 and a second assembly 10b on a second side of Destination Equipment 12.

Figure 23:
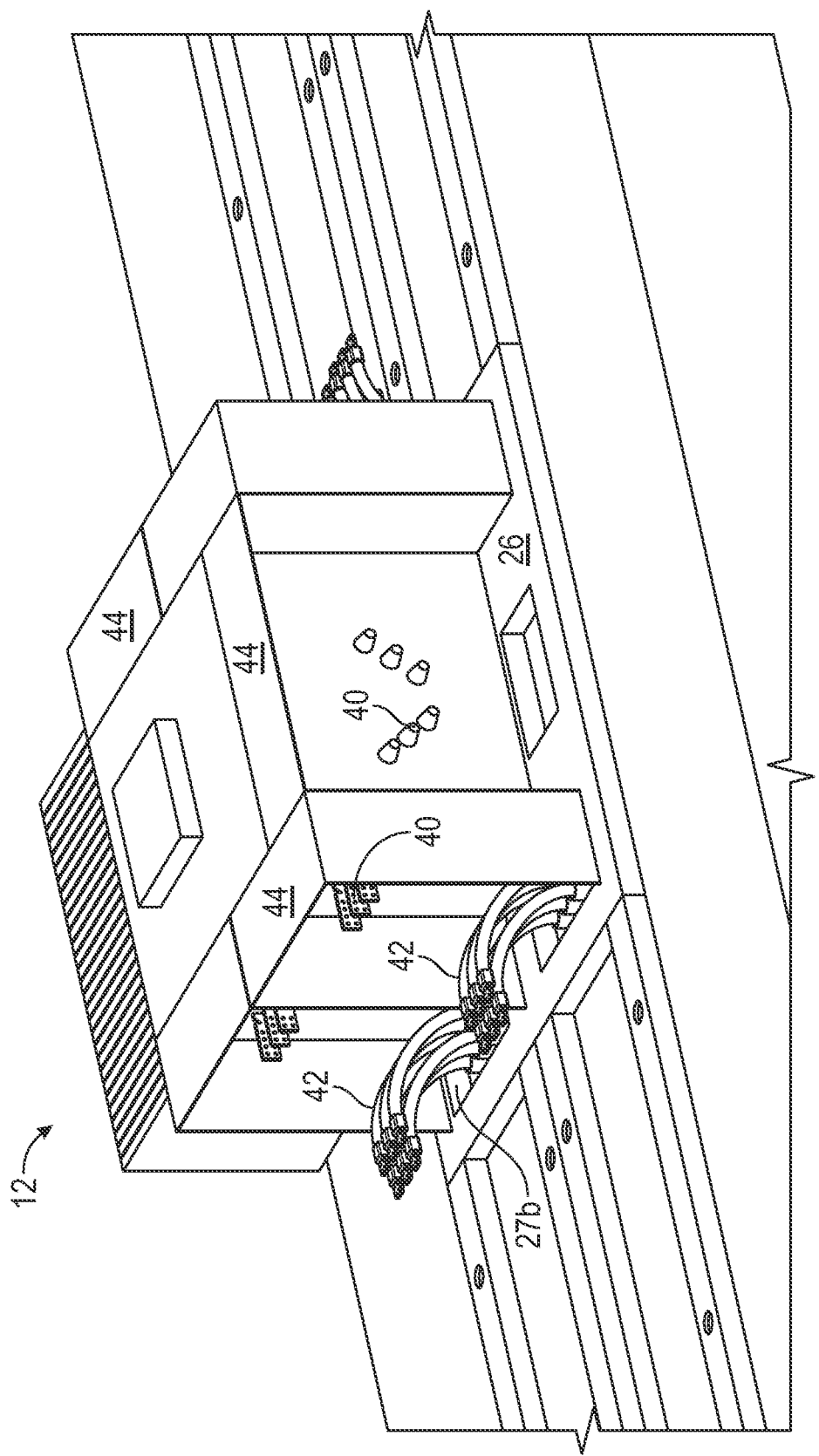
FIG. 23 is an illustration of a perspective view of a Destination Equipment and its various interface connects with two assemblies according to an embodiment of the present invention.

Referring to FIG. 23, Destination Equipment 12 preferably comprises interface connects 40 to connect the Destination Equipment to various battery storage components. To protect the battery components and interface connects 40, Destination Equipment 12 preferably comprises containment compartments 44 that at least partially surround the battery components and interface connects 40. In some embodiments, Destination Equipment 12 comprises a plurality of divided compartments 44.

Figure 24:
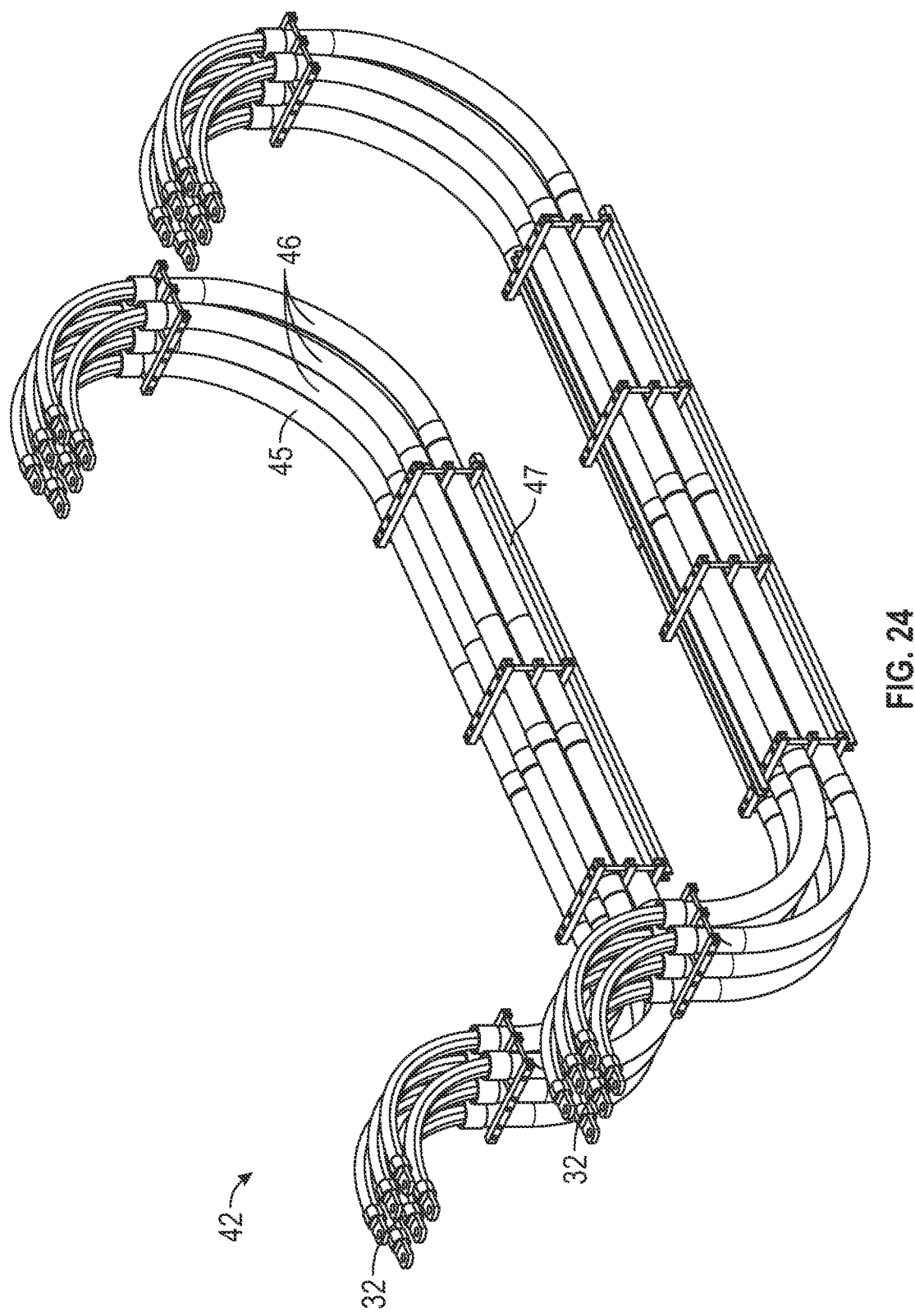
FIG. 24 is an illustration of a perspective view of cable assemblies according to an embodiment of the present invention.
Figure 25:
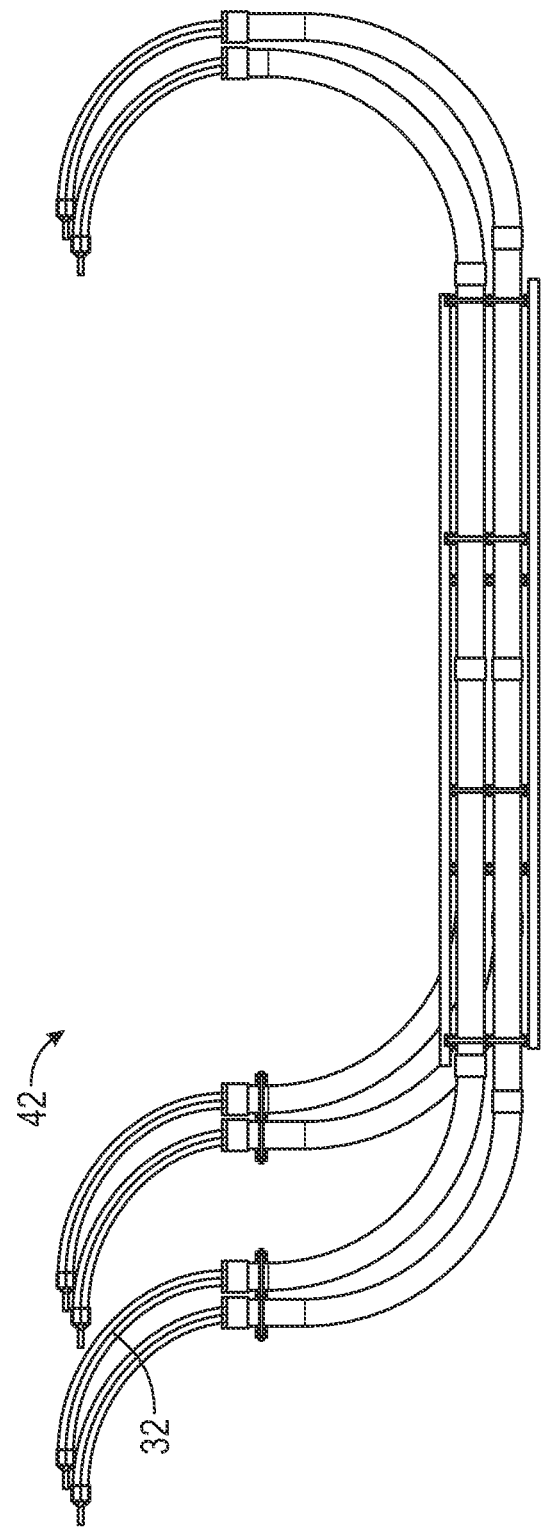
FIG. 25 is an illustration of a side view of cable assemblies according to an embodiment of the present invention.

Referring to FIGS. 23-25, embodiments of assembly 10 preferably comprise Destination Equipment cable assemblies 42 to connect Source Equipment 11 to Destination Equipment 12. As illustrated in FIG. 24, Destination Equipment cable assemblies 42 preferably comprise a plurality of cables 32 guided, oriented, or contained at least partially within guiding structure 45. Preferably, guiding structure 45 comprises guide pipes 46 and guide frames 47. Preferably, Destination Equipment cable assemblies 42 guide Destination Equipment cables 32 under Destination Equipment 12. Referring to FIG. 23, a Destination Equipment cable assembly 42 guides cables 32 from one side of the Destination Equipment 12, down through pad 26 via a first pad opening under Destination Equipment 12 for its length, and up and out second pad opening 27b opposite the first pad opening and on the other side of Destination Equipment 12. To accomplish this, guide pipes 46 preferably comprise various curved orientations and shapes. Guide frames 47 are disposed at various locations to support and/or secure guide pipes 46. In some embodiments, guide pipes 46 are secured to pad 26. In some embodiments, guide pipes 46 are secured within the ground. In some embodiments, guide pipes 46 are secured within the pad 26 itself, in a chamber within pad 26 such that the entirety of the length of guide destination cables 32 that is directly under Destination Equipment is contained within pad 26.

In one embodiment of assembly 10, Source Equipment 11 comprises an energy storage system with a capacity of at least about 100 kWh, such as those energy storage systems typically employed for commercial consumers and energy providers for use with utility scale power sources such as large scale or localized photovoltaic/solar arrays, wind farms, etc. In one embodiment, Source Equipment 11 comprises dimensions of about 1,317 mm (about 51.9 inches) in length, about 968 mm (about 38.1 inches) in width, and about 2,187 mm (about 86.1 inches in height). Accordingly, in one embodiment of assembly 10, frame comprises about the dimensions of the embodiment illustrated in FIGS. 15A-21. In another embodiment of assembly 10, Source Equipment 11 comprises an energy storage system with a capacity of at least about 1 MWh, In another embodiment of assembly 10. Source Equipment 11 comprises an energy storage system with a capacity of at least about 3 MWh, such as those energy storage systems typically employed for giga-scale energy providers for use with utility scale power sources such as large scale or localized photovoltaic/solar arrays, wind farms, etc. In another embodiment of assembly 10, Source Equipment 11 comprises an energy storage system with a capacity of at least about 10 kWh, such as those energy storage systems typically employed by an individual residence for use with single-residence power source solar systems.

Figure 26:
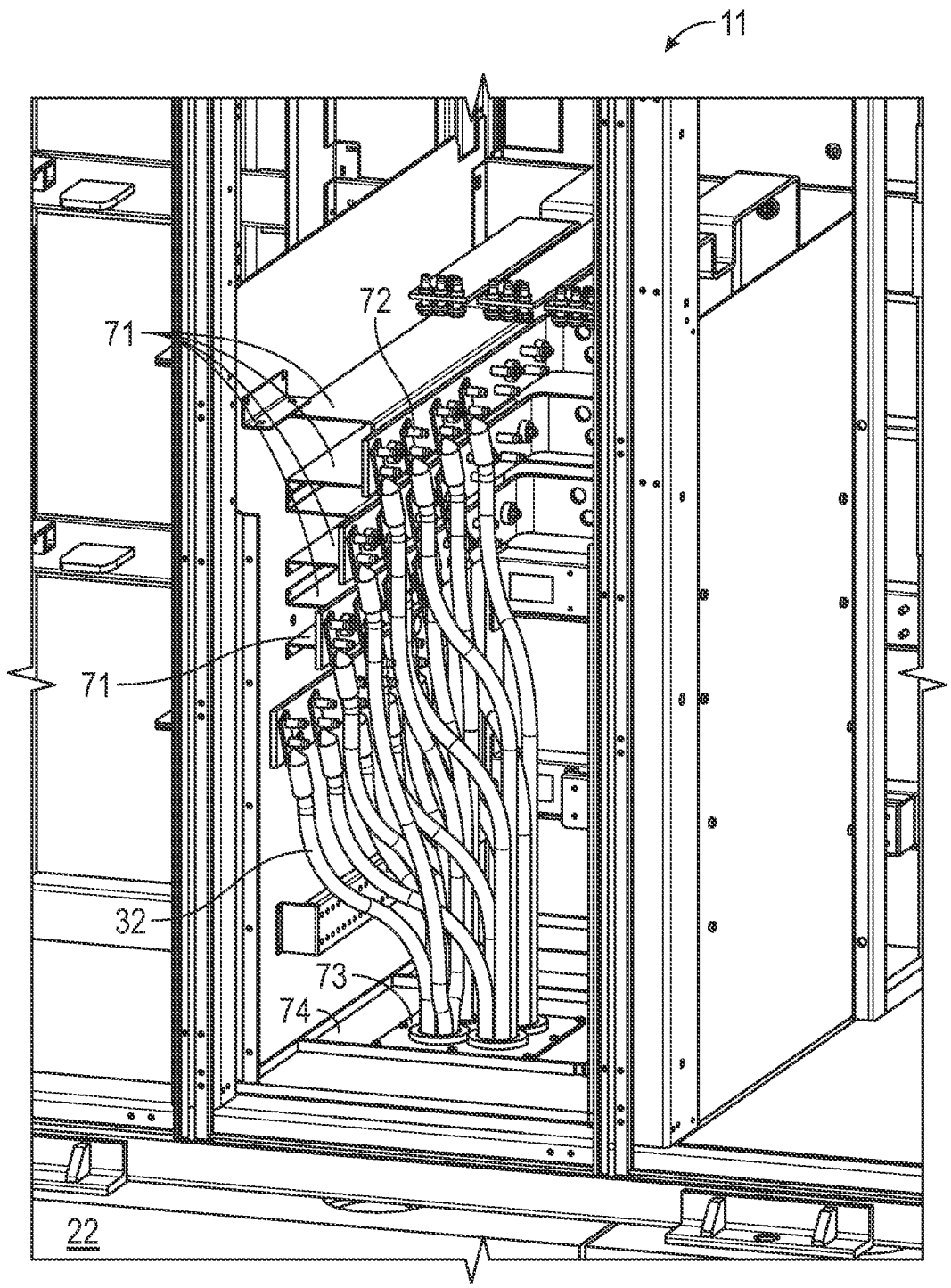
FIG. 26 is an illustration of a perspective view of a termination of cables interfacing with Source Equipment and/or Destination Equipment according to an embodiment of the present invention.
Figure 27:
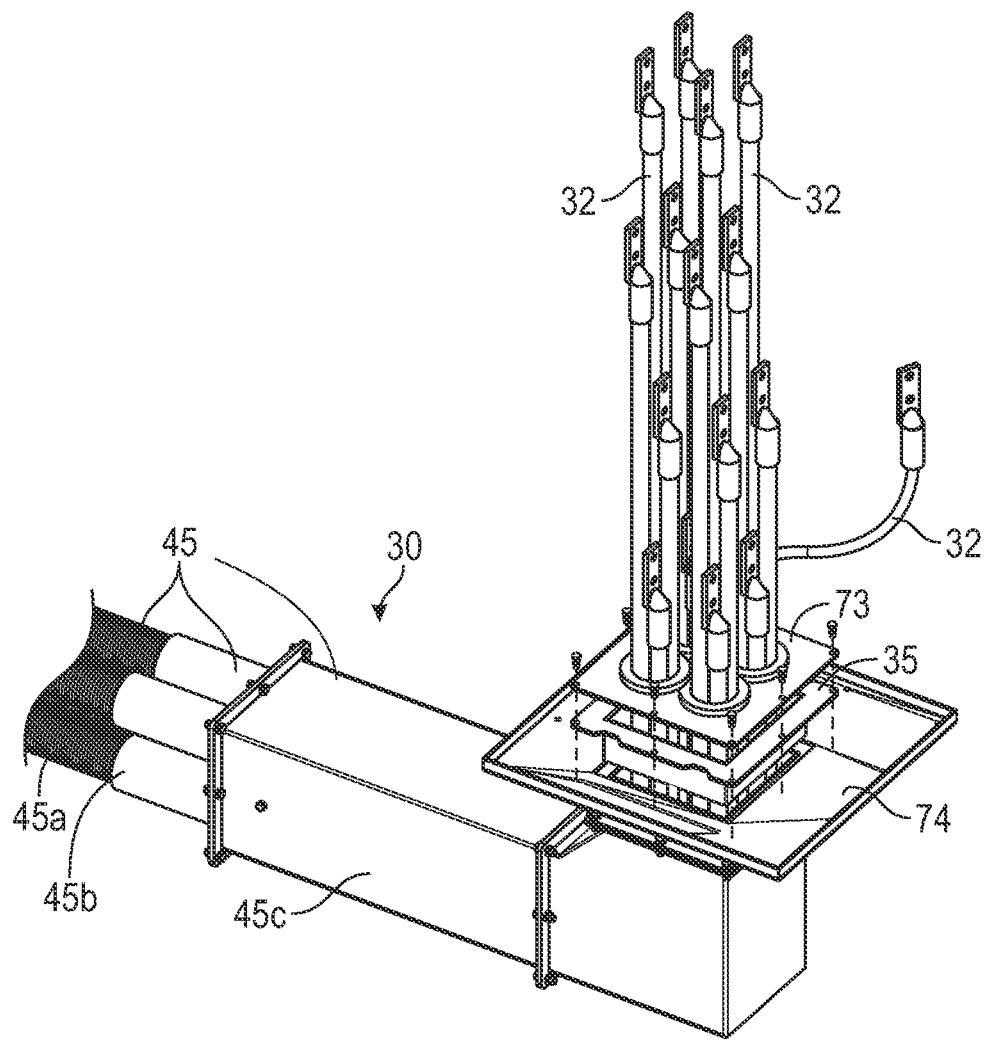
FIG. 27 is an illustration of a perspective view of a cable feeder chassis at its interface with Source Equipment and/or Destination Equipment, according to an embodiment of the present invention.

Embodiments of the present invention are also directed to the interface of cable feeder chassis 30 with Source Equipment 11 and to the terminals of cables 32 with Source Equipment 11. Referring to FIGS. 26 and 27, cables 32, are directed into Source Equipment 11 up and out of cable feeder chassis 30 disposed on beam 22 under Source Equipment 11. Referring to FIG. 26 showing the inside of a compartment of Source Equipment 11 containing terminals 72, cables 32 enter into Source Equipment 11 from cable feeder chassis 30 disposed underneath through transition plate 73. Preferably, transition plate 73 is supported by gland plate 74 forming or resting on the base of Source Equipment 11. Preferably, ladder structure 71 supports terminals 72 at a plurality of different distances from a given surface of Source Equipment 11, such that cables 32 terminate at terminals 72 in an organized fashion keeping each cable 32 separate from each other cable 32, at least at or near terminals 72. Ladder structure 71 preferably comprises a first set of terminals 72 at or on a surface on the inside of Source Equipment 11, a second set of terminals 72 disposed on a rigid structure disposed up from where the first set of terminals are and elevated at a first distance from the surface, a third set of terminals 72 disposed on a rigid structure disposed up from where the second set of terminals are and elevated at a second distance greater than the second distance, and so on until the desired number of terminals 72 are provided for the desired number of cables 32.

FIG. 27 illustrates an embodiment of an interface between cable feeder chassis 30 and Source Equipment 11 and/or Destination Equipment 12. In this embodiment, cable feeder chassis 30 comprises guiding structure 45 of a plurality of structures of varying rigidity, with first guiding structure section 45a, second guiding structure 45b, and third guiding structure 45c. Preferably, the rigidity of guiding structure 45 increases as it approaches outlet 35, the first guiding structure section 45a more flexible than second guiding structure section 45b and third guiding structure section 45c being the most rigid. In one embodiment, guiding structure section 45a comprises a flexible tube (including but not limited to flexible corrugated plastic conduits/couplings/ducts, flexible metal conduits/couplings/ducts, braided flexible metal conduits/couplings/ducts, etc.), second guiding structure section 45b comprises a pipe (including but not limited to PVC pipes, flexible metal pipes, galvanized iron pipes, etc.), and third guiding structure section 45c comprises a metal chassis assembly (including but not limited to an assembly of metal plates, boxes, conduits or tubes). In the embodiment illustrated in FIG. 27, third guiding structure section 45c comprises outlet 35 at or near its end under an inlet for cables 32 of Source Equipment 11 or Destination Equipment 12. Gland plate 74, disposed on third guiding structure section 45c, preferably comprises vertically oriented walls extending at least the distance between third guiding structure section 45c and a surface of Source Equipment 11. Outlet 35, also disposed on third guiding structure section 45c, preferably extends between third guiding structure section 45c and Source Equipment 11 and within or on top of gland plate 74. Transition plate 73 preferably rests on top of outlet 35, transition plate 73 comprising holes through which cables 32 enter into Source Equipment 11 or Destination Equipment 12. Cables 32 can then terminate within Source Equipment 11 or Destination Equipment 12 as described above and illustrated in FIG. 26 as an example.

Any particular embodiment of assembly 10 may employ any particular feature or any combination of features of any of the cable feeder chassis 30 described herein. For example, in one embodiment, cable feeder chassis 30 is disposed on a first end at or near Destination Equipment 12 and comprises a first guiding structure section 45a, second guiding structure 45b, and third guiding structure 45c as illustrated in FIG. 27, but on its other end at or near Source Equipment 11, comprises only the more flexible first guiding structure section 45a. In another embodiment, a first cable feeder chassis 30 comprises the more rigid second and/or third guiding structure sections 45b and 45c at both the first end at or near Destination Equipment 12 and the second end at or near the Source Equipment 11. In some embodiments of the present invention, assembly 10 comprises a plurality of cable feeder chassis 30. For example, in one embodiment, a first cable feeder chassis 30 is connected to a second cable feeder chassis 30 by a flexible guide structure such as first guiding structure section 45a. In this way, a series of cable feeder chassis 30 can be disposed on assembly 10 to provide a plurality of connections between a plurality of Destination Equipment 12 and Source Equipment 11.

Note that in the specification and claims, "about" or approximately means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A system comprising a first assembly apparatus comprising:
    a plurality of frame units, each frame unit comprising a top, bottom, first end and second end, the plurality of frame units capable of supporting a plurality of energy storage equipment enclosures disposed on the top of the plurality of frame units, the plurality of energy storage equipment enclosures comprising energy storage equipment having a storage capacity of at least about 1 MWh, and each frame unit comprising a cavity extending at least partially below the top of each frame unit;
    a plurality of cable feeders disposed on the plurality of frame units, each of the plurality of cable feeders extending at least partially within the cavities of the plurality of frame units and at least partially below the top of each of the plurality of frame units, and each cable feeder comprising: a body forming a cable passage through which at least one cable can pass, a cable outlet comprising an outlet through which at least one cable can pass, and a cable inlet capable of receiving cables connectable to destination energy equipment, the destination equipment comprising at least one of the electrical equipment chosen from the group consisting of: transformer, inverter, switch gear and meter; and
    a cable feeder interface comprising a gland plate and a transition plate through which the at least one cable can pass, the gland plate forming or resting on the base of an energy storage equipment enclosure of the plurality of energy storage equipment enclosures, the gland plate supporting the transition plate.

2. The system of claim 1 wherein each of the cable inlets of the plurality of cable feeders comprises a curve shape extending above the top of the plurality of frame units.

3. The system of claim 1 wherein the plurality of cable feeders comprise at least one rigid structure at least partially surrounding each of at least one cable, the at least one rigid structure configured to space each of at least one cable from the other.

4. The system of claim 1 wherein the plurality of frame units each comprise a mechanical anchoring system capable of securing the frame unit to the ground.

5. The system of claim 1 further comprising at least one cable comprising a length extending from the first end of the first frame unit to the cable outlet, the cable capable of connecting the energy storage equipment to the destination energy equipment.

6. The system of claim 1 wherein each of the plurality of frame units comprise the same dimensions as each other.

7. The system of claim 1 wherein each of the plurality of frame units are pre-engineered structural grade beams formed, extruded or molded from structural-grade materials.

8. The system of claim 1 wherein the plurality of frame units comprise a first, second, third and fourth frame unit forming a grid supporting the plurality of energy storage equipment enclosures.

9. The system of claim 8 wherein the first frame unit is in contact with the third frame unit, and the second frame unit is in contact with the fourth frame unit, and a first energy storage equipment enclosure of the plurality of energy storage equipment enclosures is disposed on the first and third frame units, and a second energy storage equipment enclosure of the plurality of energy storage equipment enclosures is disposed on the second and fourth frame units.

10. The system of claim 1, further comprising a second assembly apparatus comprising:
    a second plurality of frame units, each frame unit comprising a top, bottom, first end and second end, the second plurality of frame units capable of supporting a second plurality of energy storage equipment enclosures disposed on the top of the second plurality of frame units, the second plurality of energy storage equipment enclosures comprising energy storage equipment having a storage capacity of at least about 1 MWh, and each frame unit of the second plurality of frame units comprising a cavity extending at least partially below the top of each frame unit;
    a second plurality of cable feeders disposed on the second plurality of frame units, each of the second plurality of cable feeders extending at least partially within the cavities of the second plurality of frame units and at least partially below the top of each of the second plurality of frame units, and each cable feeder comprising: a body forming a cable passage through which at least one cable can pass, a cable outlet comprising an outlet through which at least one cable can pass, and a cable inlet capable of receiving cables connectable to the destination energy equipment.

11. The system of claim 10 wherein the first assembly apparatus is disposed on a first side of the destination equipment and the second assembly apparatus is disposed on a second side of the destination equipment.

* * * * *